US009235845B2

(12) United States Patent
Ferren et al.

(10) Patent No.: US 9,235,845 B2
(45) Date of Patent: Jan. 12, 2016

(54) INTELLIGENT REMOTE CONTROL SYSTEM

(75) Inventors: Bran Ferren, Beverly Hills, CA (US); Cory J. Booth, Beaverton, OR (US); Genevieve Bell, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 192 days.

(21) Appl. No.: 13/819,289

(22) PCT Filed: Aug. 25, 2011

(86) PCT No.: PCT/US2011/049215
§ 371 (c)(1),
(2), (4) Date: Aug. 19, 2013

(87) PCT Pub. No.: WO2012/027605
PCT Pub. Date: Mar. 1, 2012

(65) Prior Publication Data
US 2013/0322846 A1 Dec. 5, 2013

Related U.S. Application Data

(60) Provisional application No. 61/377,588, filed on Aug. 27, 2010.

(51) Int. Cl.
*G08C 19/12* (2006.01)
*H04L 17/02* (2006.01)
(Continued)

(52) U.S. Cl.
CPC .............. *G06Q 30/0201* (2013.01); *G01S 5/20* (2013.01); *G06F 3/017* (2013.01); *G06F 3/0346* (2013.01);
(Continued)

(58) Field of Classification Search
CPC .... G08C 23/04; G08C 17/02; G08C 2201/92; G08C 19/28; H04B 1/202
USPC ................... 713/320, 310, 300; 341/176, 173
See application file for complete search history.

(56) References Cited

U.S. PATENT DOCUMENTS

| | | | |
|---|---|---|---|
| 6,029,198 | A | 2/2000 | Iizuka |
| 2004/0010569 | A1 | 1/2004 | Thomas et al. |

(Continued)

FOREIGN PATENT DOCUMENTS

| | | |
|---|---|---|
| JP | 2007088753 | 4/2007 |
| JP | 2009100366 | 5/2009 |

OTHER PUBLICATIONS

International Search Report and Written Opinion received for PCT Patent Application No. PCT/US2011/049215, mailed Apr. 10, 2012, 10 pages.

(Continued)

*Primary Examiner* — Daquan Zhao
(74) *Attorney, Agent, or Firm* — Kacvinsky Daisak Bluni PLLC

(57) ABSTRACT

An apparatus may include a processor and a device state management module. The device state management module may be operative on the processor to receive a trigger signal from a motion sensor in a remote control, to determine the device state of one or more controlled devices and send state management instructions to be transmitted to the one or more controlled devices. The state management instructions may control a set of initial default operations that comprises altering one or more device states in the one or more controlled devices. The apparatus may further include a memory that is arranged to store the determined device state of one or more controlled devices. Other embodiments are described and claimed.

27 Claims, 17 Drawing Sheets

(51) Int. Cl.

| | |
|---|---|
| *G06Q 30/02* | (2012.01) |
| *G06K 9/32* | (2006.01) |
| *H04N 5/445* | (2011.01) |
| *H04N 21/431* | (2011.01) |
| *H04N 21/654* | (2011.01) |
| *G08C 17/00* | (2006.01) |
| *G08C 17/02* | (2006.01) |
| *G08C 19/00* | (2006.01) |
| *G06F 3/048* | (2013.01) |
| *G06N 5/02* | (2006.01) |
| *G01S 5/20* | (2006.01) |
| *H04N 21/45* | (2011.01) |
| *H04N 21/488* | (2011.01) |
| *H04N 5/91* | (2006.01) |
| *H04N 5/44* | (2011.01) |
| *G06F 3/0485* | (2013.01) |
| *H04L 29/06* | (2006.01) |
| *G06F 3/041* | (2006.01) |
| *H04N 21/436* | (2011.01) |
| *H04N 21/422* | (2011.01) |
| *H04N 21/443* | (2011.01) |
| *G06F 3/01* | (2006.01) |
| *G06F 3/038* | (2013.01) |
| *G06F 3/0482* | (2013.01) |
| *G06F 3/0481* | (2013.01) |
| *H04N 21/482* | (2011.01) |
| *G06F 3/0346* | (2013.01) |
| *H04N 21/4147* | (2011.01) |
| *H04N 21/433* | (2011.01) |
| *H04N 21/63* | (2011.01) |
| *G06F 1/00* | (2006.01) |
| *G06F 1/26* | (2006.01) |
| *G06F 1/32* | (2006.01) |
| *H04N 21/81* | (2011.01) |
| *H04N 21/475* | (2011.01) |

(52) U.S. Cl.
CPC .............. *G06F 3/0383* (2013.01); *G06F 3/041* (2013.01); *G06F 3/048* (2013.01); *G06F 3/0481* (2013.01); *G06F 3/0482* (2013.01); *G06F 3/0485* (2013.01); *G06K 9/3266* (2013.01); *G06N 5/02* (2013.01); *G08C 17/00* (2013.01); *G08C 17/02* (2013.01); *G08C 19/00* (2013.01); *H04L 65/403* (2013.01); *H04N 5/4403* (2013.01); *H04N 5/44504* (2013.01); *H04N 5/91* (2013.01); *H04N 21/4147* (2013.01); *H04N 21/42222* (2013.01); *H04N 21/4312* (2013.01); *H04N 21/4333* (2013.01); *H04N 21/43615* (2013.01); *H04N 21/4432* (2013.01); *H04N 21/4436* (2013.01); *H04N 21/4532* (2013.01); *H04N 21/482* (2013.01); *H04N 21/4882* (2013.01); *H04N 21/632* (2013.01); *H04N 21/654* (2013.01); *G08C 2201/32* (2013.01); *H04N 21/4755* (2013.01); *H04N 21/8133* (2013.01); *H04N 2005/44556* (2013.01)

(56) References Cited

U.S. PATENT DOCUMENTS

| | | | |
|---|---|---|---|
| 2008/0072084 | A1 | 3/2008 | Yang et al. |
| 2008/0316082 | A1 | 12/2008 | Yang |
| 2009/0128714 | A1 | 5/2009 | Taya |
| 2009/0158203 | A1 | 6/2009 | Kerr et al. |
| 2009/0241052 | A1* | 9/2009 | Ha et al. ............ 715/772 |
| 2010/0052843 | A1* | 3/2010 | Cannistraro .......... 340/3.32 |
| 2010/0164993 | A1 | 7/2010 | Yoshida |

OTHER PUBLICATIONS

Extended European Search Report received for European Patent Application No. 11820677.0, mailed Jan. 29, 2015, 10 pages.

\* cited by examiner

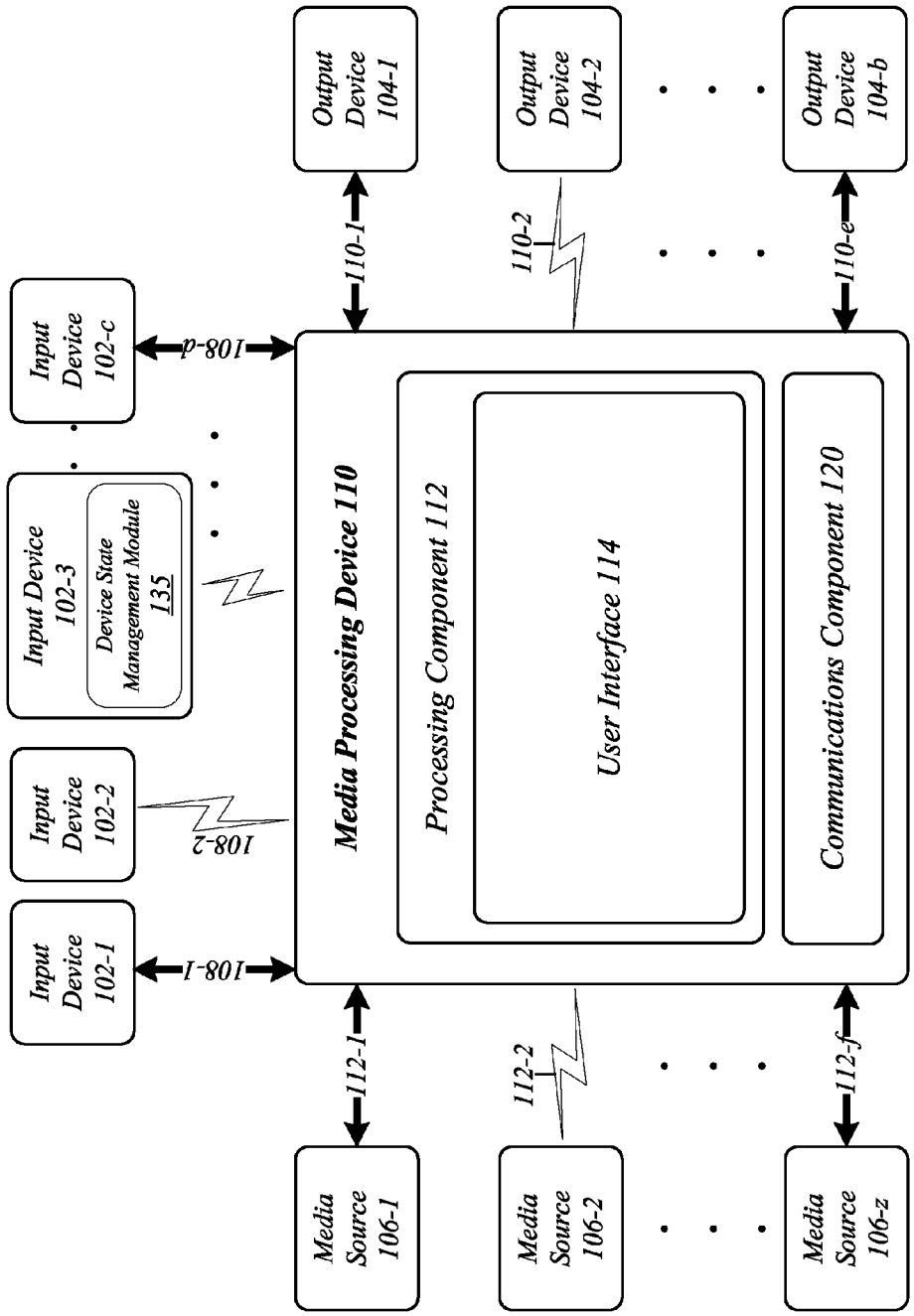

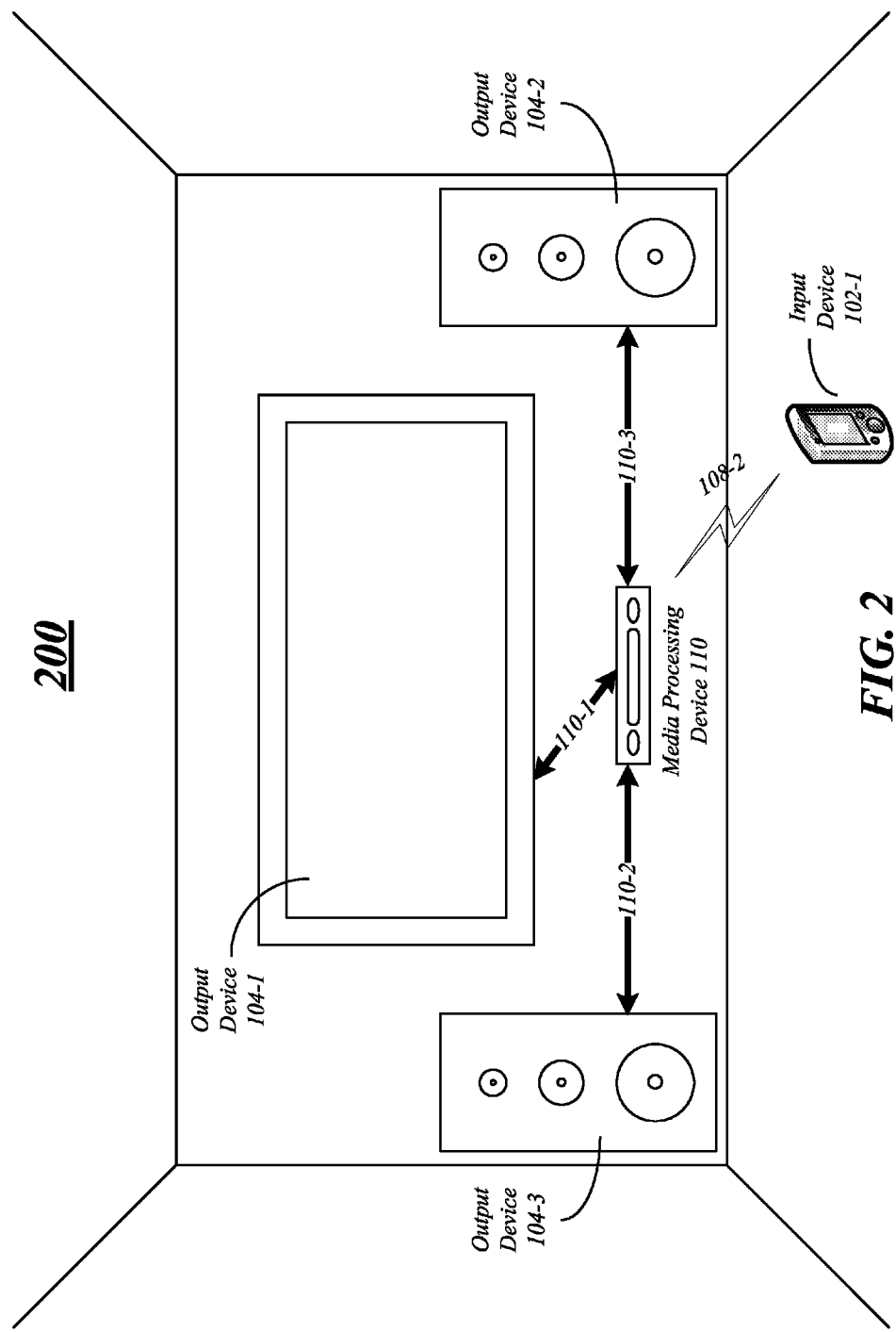

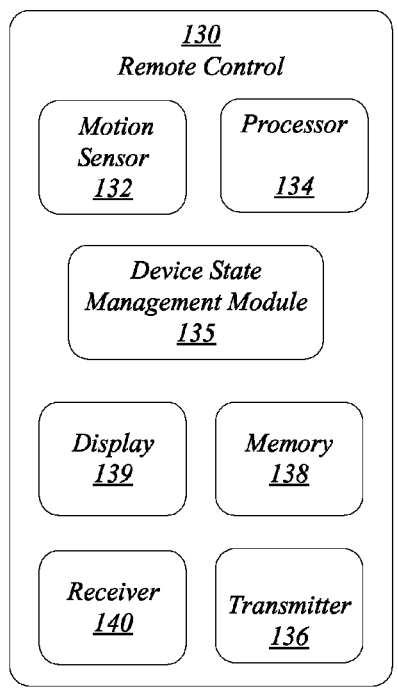
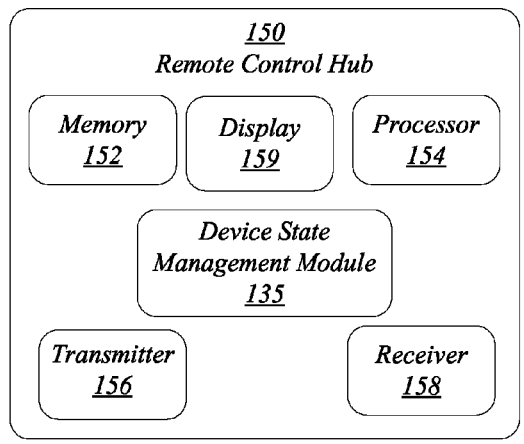
FIG. 3a
FIG. 3b

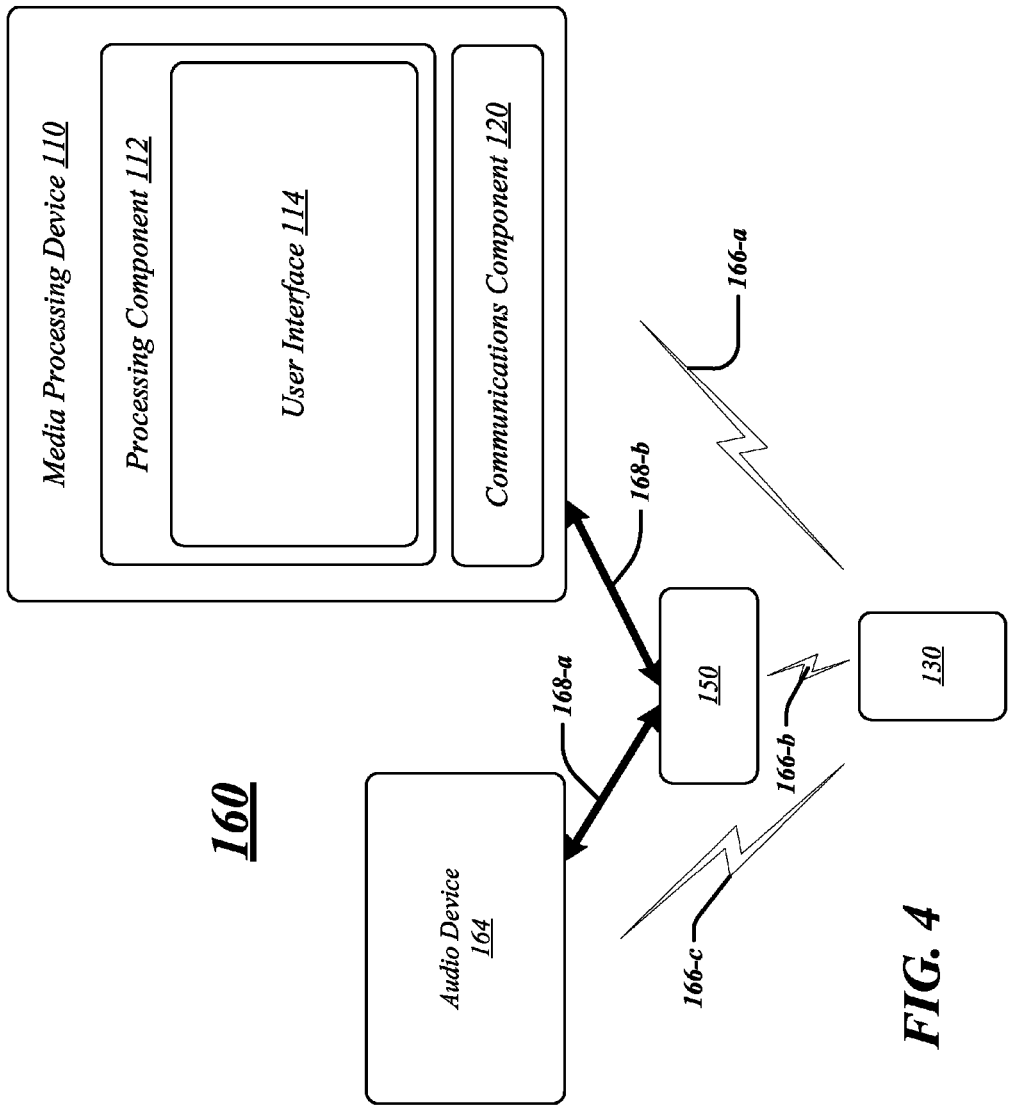

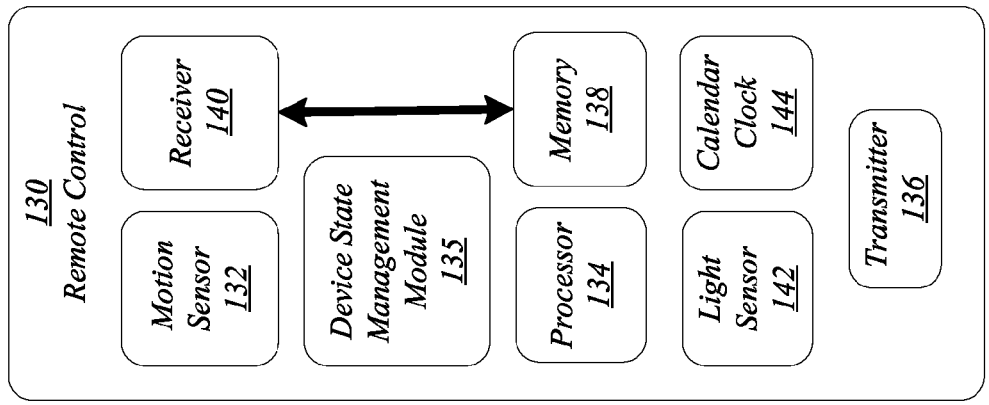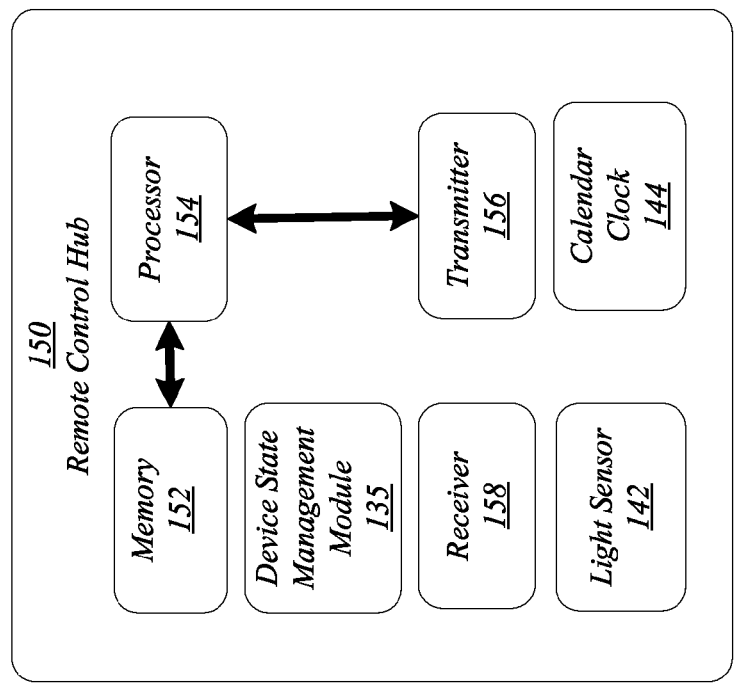
FIG. 6b

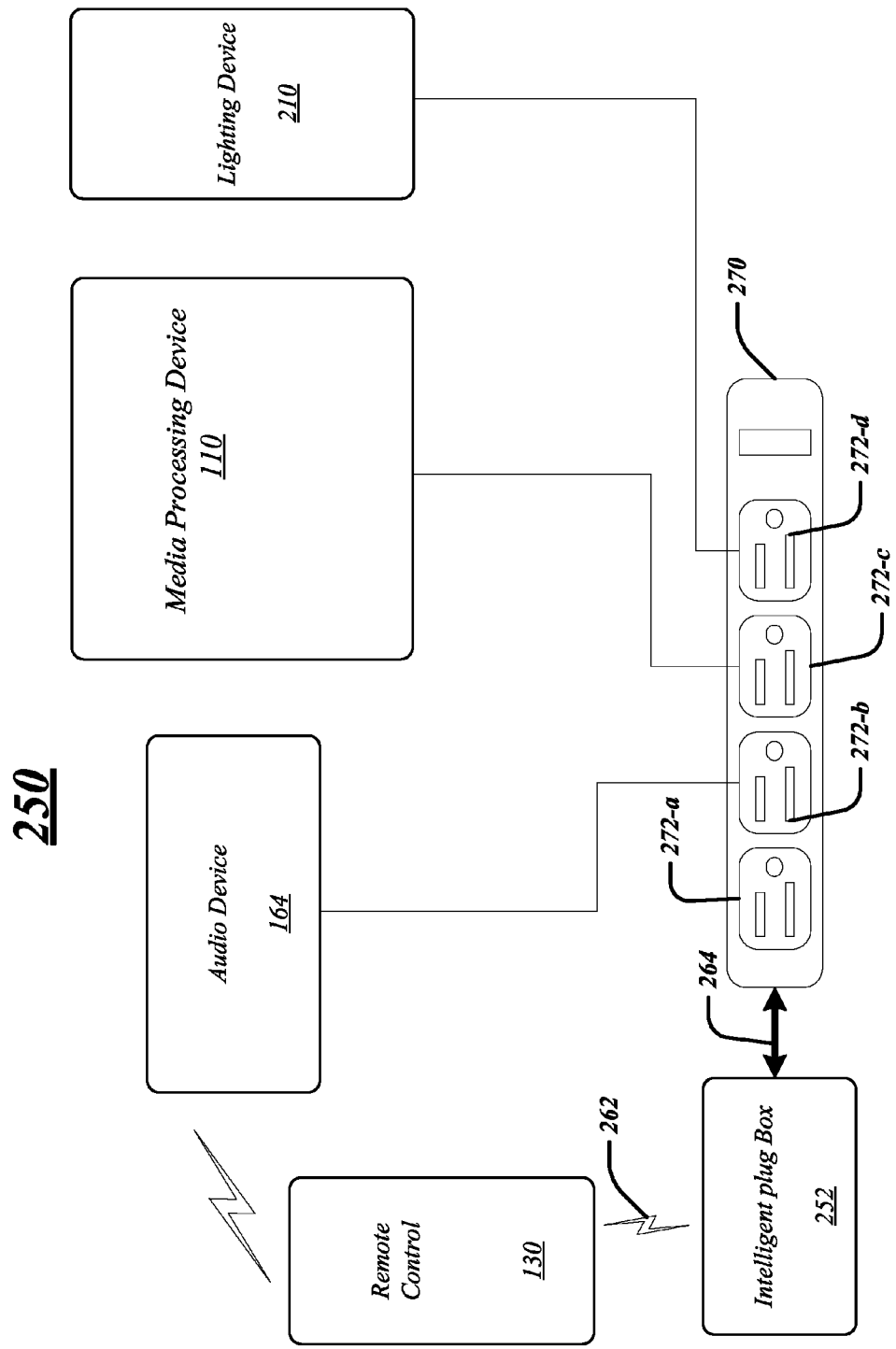

INTELLIGENT REMOTE CONTROL SYSTEM

RELATED APPLICATIONS

This application claims priority to U.S. Provisional Patent Application Ser. No. 61/377,588 filed Aug. 27, 2010, which is incorporated herein by reference in its entirety.

BACKGROUND

In many instances, the use of present day remote controls in a home environment entails an extensive and often intricate series of "startup" operations that are needed to enable the desired external devices to power on and reach a desired state. This may often entail a routine sequence that includes turning on the remote control itself (in the case of high-end, universal remotes with an onboard display) and/or powering on a home entertainment system, television and a stereo. The repetitive nature of this task may prove a source of frustration to many users, who may prefer a system that can automate these operations to reduce the amount of operations the user has to perform. Many present day universal remotes may allow a user to program "macro" sequences of commonly executed commands. But even in these devices, the user must still power on the universal remote and execute the macro command—a task that may itself require several key presses.

A further problem encountered by users of present day remote controls is that the remote controls may operate in the same manner regardless of the state of the device or devices the remote control is meant to control. For example, a remote control for an audio amplifier may not in any be sense "aware" of the power state of the amplifier. In particular, present day remote controls are not designed to sense the power state of each device being controlled ("controlled device"). This is true of both original equipment manufacturer (OEM) remotes that may be designed by the same vendor that provides the controlled device, and of "universal" remotes that are designed to emulate the IR command signals of several OEM remote controls, allowing for simultaneous control of multiple devices. Moreover, present day remote controls are not designed to explicitly direct a controlled device into an "on" or "off" state, but only to toggle from one state or another, without explicit knowledge of the present state of the controlled device. The consequences of the remote control not having awareness of the state of a controlled device and only being able to toggle between states, can be particularly bothersome when multiple devices need to be placed on at the same time. In one scenario when a user first desires to enable a set of controlled devices, the user may find that some devices are in an "on" state while others are in an "off" state. In another scenario, the user may attempt to turn on multiple controlled devices simultaneously that are all initially in an "off" state. If one or more of the controlled devices do not successfully receive and interpret the "power-on" command signal transmitted by the remote, the device will not respond. This can result in the scenario where some devices successfully power on while others remain in an "off" state. In either scenario, once the state is reached where some controlled devices are in an "off" state and others in an "on" state, once the attempts to remedy the situation by performing the "power-on" command, those devices that were initially on may power off, while those that were off may power on. In this manner, a series of control signals sent from a remote control to multiple controlled devices may toggle the respective devices back and forth between states without ever achieving the goal of powering all controlled devices on simultaneously.

Accordingly, there may be a need for improved techniques to solve these and other problems.

BRIEF DESCRIPTION OF THE DRAWINGS

FIG. 1 illustrates one embodiment of a media processing system.

FIG. 2 illustrates one embodiment of a media processing component.

FIG. 3a depicts exemplary features of an embodiment of a remote control.

FIG. 3b depicts a remote control hub arranged in accordance with various embodiments.

FIG. 4 depicts one embodiment of an intelligent remote control (IRC) system.

FIG. 6b depicts one embodiment of an intelligent remote control system.

FIG. 8a illustrates one embodiment of an intelligent remote control system.

DETAILED DESCRIPTION

Figure 5:
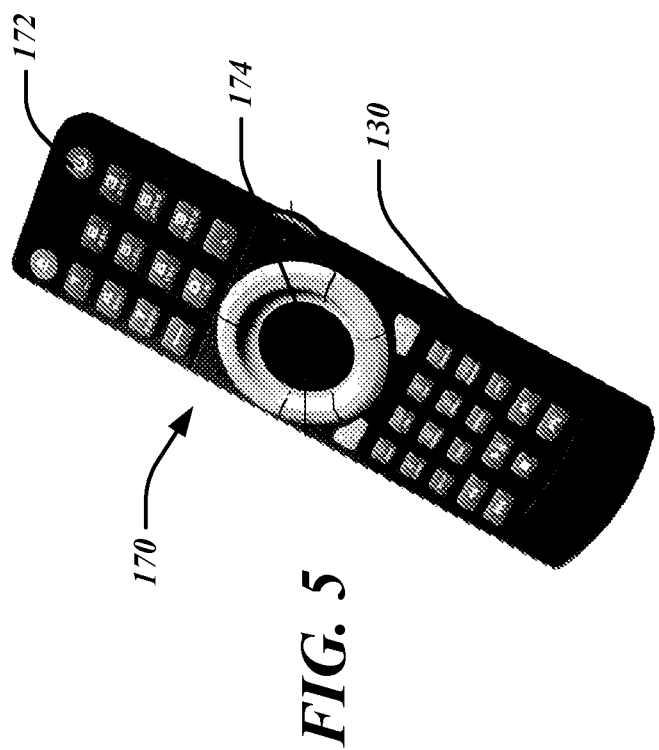
FIG. 5 shows an exemplary user interface for a remote control.

Consumer electronics, processing systems and communications systems are converging. For instance, consumer electronics such as digital televisions and media centers are evolving to include processing capabilities typically found on a computer and communications capabilities typically found in mobile devices. As such, heterogeneous consumer electronics continue to evolve into a single integrated system, sometimes referred to as a "digital home system."

A digital home system may be arranged to provide a compelling entertainment environment in which a user can move seamlessly between television viewing, internet access, and home media management in various embodiments. In some embodiments, a single flexible and dynamic interface may allow a user to find the television programming that they wish to view, acquire the information that they seek from the Web, or enjoy personal audio files, photos, and movies. The system may also facilitate enhanced television viewing, enable collaborative interaction with family and friends, and securely execute financial transactions. A digital home system may provide these features while retaining the familiar design sensibilities and ease-of-use of a traditional television.

In various embodiments, a digital home system may address common deficiencies associated with current entertainment systems in which access to television programming, the internet, and personal media requires operation of three separate interfaces. For example, a unified interface of the digital home system may incorporate physical and graphical elements tied to an easily understood underlying organizational framework, making a home entertainment experience more interesting, compelling, engaging, and efficient. A unified interface may combine the best aspects of the three integrated paradigms, e.g., those of television, internet, and computers. For example, elements such as animation, information-rich displays, and video and audio cues from traditional televisions and television menus may be incorporated into the unified interface. Similarly, seamless integration of different forms of content and communications mechanisms from traditional internet experiences, allowing links from one form of content to another and providing tools such as messaging and video conferencing may also be incorporated. And from computers, point-and-click mechanisms that allow effective navigation of complex information spaces may also be part of the unified interface of the digital home system in various embodiments.

The digital home system may utilize, in some embodiments, a visual display such as a television display as a navigation device. Using the display in combination with any number of remote control devices, a user can carry out complex tasks in fulfilling and transformative ways. The digital home system may include familiar mechanisms such as on-screen programming guides, innovative technologies that facilitate navigation via natural motions and gestures and context-sensitivity that understands the user and the options available to the user which all combine to make the digital home system experience intuitive and efficient as it empowers the user to utilize multiple devices in a seamlessly integrated way.

For a typical television-viewing, media-perusing, and web-browsing home user, the digital home system may be arranged to provide a unified home entertainment experience, allowing the user to freely navigate through television, media, and internet offerings from a traditional viewing position (such as a sofa) using a unified interface. In some embodiments, the unified interface integrates the information provided by a diverse array of devices and services into the existing television or other display in a functionally seamless and easily understood manner.

The digital home system may include, in various embodiments, a multi-axis integrated on-screen navigation allowing the display screen to be used for navigation as well as for the presentation of content. In some embodiments, the digital home system may also include a user interface engine operative to provide context-sensitive features and overlays intelligently integrated with the underlying content and adaptive to the viewing environment. A family of remote control and other input/output device may also be incorporated into the digital home system in various embodiments to further enhance the intuitive user interactions, ease of use and overall quality of the system. The embodiments are not limited in this context.

Various embodiments are directed to remote control devices that have substantially different shape and geometry relative to conventional remote controls. In some embodiments a remote control device (also termed "remote control" herein) may have a generally spherical shape while in other embodiments a remote control device may have a polyhedral shape, such as a cube shape. As detailed below, user interaction with remote control devices arranged according to the present embodiments may be substantially different than with known remote controls because of different shapes, different user interfaces, and sensors provided by remote controls of the present embodiments. As a result, the embodiments can improve affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for a media processing system 100. The media processing system 100 is generally directed to performing media processing operations for media content in accordance with any associated control signaling necessary for presenting media content on an output device. In one embodiment, the media processing system 100 is particularly arranged to provide media content from disparate media sources to viewers in a home environment, such as a digital home system, for example. However, the media processing system 100 may be suitable for any use scenarios involving presentation and display of media content. Although the media processing system 100 shown in FIG. 1 has a limited number of elements in a certain topology, it may be appreciated that the media processing system 100 may include more or less elements in alternate topologies as desired for a given implementation. The embodiments are not limited in this context.

In various embodiments, various elements of the media processing system 100 may communicate, manage, or process information in accordance with one or more protocols. A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as the National Television Systems Committee (NTSC) standards, the Advanced Television Systems Committee (ATSC) standards, the Phase Alteration by Line (PAL) standards, the MPEG-1 standard, the MPEG-2 standard, the MPEG-4 standard, the Open Cable standard, the Society of Motion Picture and Television Engineers (SMPTE) Video-Codec (VC-1) standards, the ITU/IEC H.263 and H.264 standards, and others. Another example may include various Digital Video Broadcasting (DVB) standards, such as the Digital Video Broadcasting Terrestrial (DVB-T) broadcasting standard, the DVB Satellite (DVB-S) broadcasting standard, the DVB Cable (DVB-C) broadcasting standard, and others. Digital Video Broadcasting (DVB) is a suite of internationally accepted open standards for digital television. DVB standards are maintained by the DVB Project, an international industry consortium, and they are published by a Joint Technical Committee (JTC) of European Telecommunications Standards Institute (ETSI), European Committee for Electrotechnical Standardization (CENELEC) and European Broadcasting Union (EBU). The embodiments are not limited in this context.

In various embodiments, elements of the media processing system 100 may be arranged to communicate, manage or process different types of information, such as media information and control information. Examples of media information may generally include any data or signals representing multimedia content meant for a user, such as media content, voice information, video information, audio information, image information, textual information, numerical information, alphanumeric symbols, graphics, and so forth. Control information may refer to any data or signals representing commands, instructions, control directives or control words meant for an automated system. For example, control information may be used to route media information through a system, to establish a connection between devices, instruct a device to process the media information in a predetermined manner, monitor or communicate status, perform synchronization, and so forth. The embodiments are not limited in this context.

In various embodiments, media processing system 100 may be implemented as a wired communication system, a wireless communication system, or a combination of both. Although media processing system 100 may be illustrated using a particular communications media by way of example, it may be appreciated that the principles and techniques discussed herein may be implemented using any type of communication media and accompanying technology. The embodiments are not limited in this context.

When implemented as a wired system, for example, the media processing system 100 may include one or more elements arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a device using an input/output (I/O) adapter. The I/O adapter may be arranged to operate with any suitable technique for controlling information signals between elements using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, the media processing system 100 may include one or more wireless elements arranged to communicate information over one or more types of wireless communication media. An example of wireless communication media may include portions of a wireless spectrum, such as the RF spectrum. The wireless elements may include components and interfaces suitable for communicating information signals over the designated wireless spectrum, such as one or more antennas, wireless transmitters, receiver, transmitters/receivers ("transceivers"), amplifiers, filters, control logic, antennas, and so forth. The embodiments are not limited in this context.

In the illustrated embodiment shown in FIG. 1, the media processing system 100 may comprise a media processing device 110. The media processing device 110 may further comprise one or more input devices 102-$a$, one or more output devices 104-$b$, and one or more media sources 106-$c$. The media processing device 110 may be communicatively coupled to the input devices 102-$a$, the output devices 104-$b$, and the media sources 106-$c$ via respective wireless or wired communications connections 108-$d$, 110-$e$ and 112-$f$.

It is worthy to note that "a" and "b" and "c" and similar designators as used herein are intended to be variables representing any positive integer. Thus, for example, if an implementation sets a value for a=5, then a complete set of input devices 102-$a$ may include computing devices 102-1, 102-2, 102-3, 102-4 and 102-5. The embodiments are not limited in this context.

In various embodiments, the media processing system 100 may include one or more input devices 102-$a$. In general, each input device 102-$a$ may comprise any component or device capable of providing information to the media processing device 110. Examples of input devices 102-$a$ may include without limitation remote controls, pointing devices, keyboards, keypads, trackballs, trackpads, touchscreens, joysticks, game controllers, sensors, biometric sensors, thermal sensors, motion sensors, directional sensors, microphones, microphone arrays, video cameras, video camera arrays, global positioning system devices, mobile computing devices, laptop computers, desktop computers, handheld computing devices, tablet computing devices, netbook computing devices, smart phones, cellular telephones, wearable computers, and so forth. The embodiments are not limited in this context. In some embodiments, an input device 102-$a$ may include a device state management module 135 for setting the device state in one or more other devices as described in detail below.

In various embodiments, the media processing system 100 may include one or more output devices 104-$b$. An output device 104-$b$ may comprise any electronic device capable of reproducing, rendering or presenting media content for consumption by a human being. Examples of output devices 104-$b$ may include without limitation a display, an analog display, a digital display, a television display, audio speakers, headphones, a printing device, lighting systems, warning systems, mobile computing devices, laptop computers, desktop computers, handheld computing devices, tablet computing devices, netbook computing devices and so forth. The embodiments are not limited in this context.

While various embodiments refer to input devices 102-$a$ providing information to media processing device 110 and output devices 104-$b$ receiving information from media processing device, it should be understood that one or more of the input devices 102-$a$ and output device 104-$b$ may allow for the exchange of information to and from media processing device 110 via their respective connections 108-$d$ and 110-$e$. For example, one or more of input devices 102-$a$ may be operative to provide information to media processing device 110 and to receive information from media processing device 110. In various embodiments, one or more of output devices 104-$b$ may be operative to receive information from media processing device 110 and may also be operative to provide information to media processing device 110. Similarly, there may be a bi-directional exchange between the media processing device 110 and media sources 106-$c$. For instance, a media source 106-$c$ may be operative to provide media information to the media processing device 110 and to receive information from the media processing device 110. An example of this would be a video on demand (VOD) application implemented by the media processing device 110. The embodiments are not limited in this context.

In one embodiment, for example, the media processing system 100 may include a display 104-1. The display 104-1 may comprise any analog or digital display capable of presenting media information received from media sources 106-$c$. The display 104-1 may display the media information at a defined format resolution. In various embodiments, for example, the incoming video signals received from media sources 106-$c$ may have a native format, sometimes referred to as a visual resolution format. Examples of a visual resolution format include a digital television (DTV) format, high definition television (HDTV), progressive format, computer display formats, and so forth. For example, the media information may be encoded with a vertical resolution format ranging between 480 visible lines per frame to 1080 visible lines per frame, and a horizontal resolution format ranging between 640 visible pixels per line to 1920 visible pixels per line. In one embodiment, for example, the media information may be encoded in an HDTV video signal having a visual resolution format of 720 progressive (720p), which refers to 720 vertical pixels and 1280 horizontal pixels (720×1280). In another example, the media information may have a visual resolution format corresponding to various computer display formats, such as a video graphics array (VGA) format resolution (640×480), an extended graphics array (XGA) format resolution (1024×768), a super XGA (SXGA) format resolution (1280×1024), an ultra XGA (UXGA) format resolution (1600×1200), and so forth. The embodiments are not limited in this context. The type of displays and format resolutions may vary in accordance with a given set of design or performance constraints, and the embodiments are not limited in this context.

In various embodiments, the media processing system 100 may include one or more media sources 106-c. Media sources 106-c may comprise any media source capable of sourcing or delivering media information and/or control information to media processing device 110. More particularly, media sources 106-c may comprise any media source capable of sourcing or delivering digital audio and/or video (AV) signals to media processing device 110. Examples of media sources 106-c may include any hardware or software element capable of storing and/or delivering media information, such as a digital video recorder (DVR), a personal video recorder (PVR), a digital versatile disc (DVD) device, a video home system (VHS) device, a digital VHS device, a disk drive, a hard drive, an optical disc drive a universal serial bus (USB) flash drive, a memory card, a secure digital (SD) memory card, a mass storage device, a flash drive, a computer, a gaming console, a compact disc (CD) player, computer-readable or machine-readable memory, a digital camera, camcorder, video surveillance system, teleconferencing system, telephone system, medical and measuring instruments, scanner system, copier system, television system, digital television system, set top boxes, personal video records, server systems, computer systems, personal computer systems, smart phones, tablets, notebooks, handheld computers, wearable computers, portable media players (PMP), portable media recorders (PMR), digital audio devices (e.g., MP3 players), digital media servers and so forth. Other examples of media sources 106-c may include media distribution systems to provide broadcast or streaming analog or digital AV signals to media processing device 110. Examples of media distribution systems may include, for example, Over The Air (OTA) broadcast systems, terrestrial cable systems (CATV), satellite broadcast systems, and so forth. It is worthy to note that media sources 106-c may be internal or external to media processing device 110, depending upon a given implementation. The embodiments are not limited in this context.

In various embodiments, the media processing system 100 may include one or more media processing devices 110. The media processing device 110 may comprise any electronic device arranged to receive, process, manage, and/or present media information received from media sources 106-c. In general, the media processing device 110 may include, among other elements, a processing system, a processing sub-system, a processor, a computer, a device, an encoder, a decoder, a coder/decoder (codec), a filtering device (e.g., graphic scaling device, deblocking filtering device), a transformation device, an entertainment system, a display, or any other processing or communications architecture. The embodiments are not limited in this context.

The media processing device 110 may execute processing operations or logic for the media processing system 100 using a processing component 112. The processing component 112 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The media processing device 110 may execute communications operations or logic for the media processing system 100 using communications component 120. The communications component 120 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 120 may include various types of standard communication elements, such as one or more communications interfaces, network interfaces, network interface cards (NIC), radios, wireless transmitters/receivers (transceivers), wired and/or wireless communication media, infra-red transceivers, serial interfaces, parallel interfaces, bus interfaces, physical connectors, and so forth. By way of example, and not limitation, communication media 120 includes wired communications media and wireless communications media, as previously described.

In various embodiments, the media processing device 110 may comprise a user interface. User interface 114 is shown as part of media processing device 110 for purposes of illustration and not limitation. It should be understood that user interface could be located in other devices, components or nodes of media processing system 100 in various embodiments and still fall within the described embodiments.

FIG. 2 illustrates a block diagram for a media processing system 200 that may be the same or similar to media processing system 100 of FIG. 1 where like elements are similarly numbered. The media processing system 200 may comprise a sample digital home system implementation that is arranged to provide media content from disparate media sources to viewers in a home, office, or room environment. Although the media processing system 200 shown in FIG. 2 has a limited number of elements in a certain topology, it may be appreciated that the media processing system 200 may include more or less elements in alternate topologies as desired for a given implementation. The embodiments are not limited in this context.

In the illustrated embodiment shown in FIG. 2, the media processing system 200 may comprise a media processing device 110, input device 102-1, output devices 104-1, 104-2 and 104-3, and one or more media sources 106 (not shown). The media processing device 110 may be communicatively coupled to the input device 102-1, the output devices 104-1, 104-2 and 104-3, and the media sources 106 via respective wireless or wired communications connections 108-2, 110-1, 110-2 and 110-3. For purposes of illustration, the one or more media sources 106 of FIG. 2 (not shown) are part of, or integrated into, media processing device 110. Other embodiments are described and claimed.

In various embodiments, media processing device 110 may comprise a set-top box, digital media hub, media server, or other suitable processing device arranged to control the digital home system 200. While shown as a separate component in FIG. 2, it should be understood that media processing device 110 may be arranged as part of output device 104-1 or any other suitable component of system 200 in some embodiments. Output device 104-1 may comprise a digital television arranged to display information received from media processing device 110 over connection 110-1 in some embodiments. In various embodiments, output devices 104-2 and 104-3 may comprise speakers arranged to reproduce audio or other acoustic signals received from media processing device 110 over connections 110-2 and 110-3 respectively. Input device 102-1 may comprise a remote control, smart phone, or other suitable processing device capable of communicating with media processing device 110, output device 104-1 or any other device in the digital home system 200. Together, each of the components, nodes or devices of media processing system 200 may form or comprise one example embodiment of digital home entertainment system. The embodiments are not limited to the type, number or arrangement of components illustrated in FIG. 2.

Various embodiments described herein provide intelligent remote control apparatus and systems that may perform control operations on one or more controlled devices. The term "controlled device" is used to refer to a device that may receive control signals that are sent from a remote control or remote control hub, which signals are used to control functioning of the controlled device. Examples of controlled devices include the aforementioned media processing device 110, input devices 102, output devices 104, media source devices 106, and other devices including lighting devices, stand-alone electronic devices, and appliances. The control operations that are performed by a remote control may be based on multiple factors including power status of the controlled devices, use history of controlled devices, time of day, lighting conditions, and other factors that may provide context to be accounted for when the remote control sends control signals to the controlled devices. In some embodiments, a remote control may initiate a series of operations automatically based upon minimal user input, such as the act of picking up the remote control. In other embodiments, the remote control may selectively turn on or turn off controlled devices based upon the present state of the controlled device (the terms "state" and "status" are generally interchangeable as used herein).

Instead, in the present embodiments, this set of operations may be automatically performed by the remote control 130 when it is picked up so that no other operation need be performed by the user to place the media processing system 110 and audio device 164 "on" so that the user can watch and listen to a desired program, watch a desired movie, etc.

FIG. 3a depicts exemplary features of an embodiment of a remote control 130. In various embodiments, the remote control 130 may be used to control operation of external devices including televisions, audio equipment, video game equipment, home theater equipment, hybrid electronic devices, computing devices, communications devices, and other devices. The remote control 130 includes a motion sensor 132, which may detect motion of the remote control itself. The term "motion sensor" as used herein, generally refers to a set of devices that are arranged to detect the motion of the remote control itself and not arranged to detect motion of external objects. The motion sensor 132 may detect a translational or rotational movement of the remote control according to various embodiments. The term "translational," as used herein, refers to a motion in which the position of the center of the remote control moves, as opposed to a rotational movement, which may involve a stationary center (or other point) of the remote control while the remote control rotates about an axis. This information may be transmitted to other devices in the remote control 130 or external to the remote control. In one example, the motion sensor may detect that a remote control has been picked up after being stationary for a period of time. This detection may then trigger other actions as described in more detail below. For example, in various embodiments, an acceleration of the remote control 130 may be used to automatically trigger a series of actions.

Remote control 130 also includes a processor 134, which may be coupled to motion sensor 132. In some embodiments, remote control 130 may include a device state management module 135 that is operative on processor 134 to perform various functions. In various embodiments the device state management module 135 may be included within processor 134 or may be distributed within memory 138 and processor 134. The device state management module 135 may operate on processor 134 to receive signals from the motion sensor and interpret the signals received from motion sensor 132 in order to determine the state of the remote control. The processor 134 may, for example, execute a sequence of operations, which sequence may be prestored in the processor 134 or in memory 138 of remote control 122. In one example, based upon detected motion in the remote control, the device state management module 135 may operate on the processor 134 to send state management instructions to one or more external (controlled) devices. These state management instructions may direct whether a controlled device is to be switched from a present device state to a different device state.

In operation, a user may move remote control 122 in one or more ways that may act as a trigger for remote control 130 to perform one or more actions.

Remote control 130 further includes a transmitter 136, which may be used to transmit a signal, such as a control signal, to a controlled device. The transmitter 136 may employ an infrared signal, a radio frequency signal, or other wireless signal according to various embodiments. In some embodiments, the transmitter 136 may comprise multiple devices, such as an infrared light emitting diode (LED) and a radio frequency (RF) transmitter chip and RF antenna. The transmitter 136 may be coupled to motion sensor 132 and may be coupled to processor 134 in order to receive signals that may be forwarded or used by transmitter 136 to produce control signals to be sent to a controlled device. In some embodiments, the remote control 130 may include a digital display 139 to display alphanumeric and/or pictorial information.

FIG. 3b depicts a remote control hub 150 arranged in accordance with various embodiments. The remote control hub may include a memory 152, processor 154, device state management module 135, transmitter 156 and receiver 158. In various embodiments described herein below, remote control hub 150 may facilitate the ability of remote control 130 to perform as an intelligent remote control. In some embodiments, the remote control hub 150 may include a digital display 159 to display alphanumeric and/or pictorial information.

In the discussion to follow embodiments that involve a system that includes a remote control hub 150 and remote control 130 are disclosed. However, in other embodiments the functionality of both remote control and remote control hub may be encompassed by a single device, such as a wireless remote control. FIG. 4 depicts one embodiment of an intelligent remote control (IRC) system 160. IRC system 160 includes remote control 130, which may be wirelessly linked to the remote control hub 150. The remote control 130 may also be wirelessly linked to any number of controlled devices, such as media processing device 110 and audio device 164, and to remote control hub 150, via respective wireless links 166a, 166c, and 166b depicted in FIG. 4. In various embodiments, remote control 130 may have both a wireless transmitter and wireless receiver as depicted in FIG. 3a. These wireless devices may allow remote control 130 to both send and receive signals from external devices including remote control hub 150, media processing device 110, and audio device 164. The remote control hub 150 may be linked to controlled devices through any combination of wired and/or wireless links. As depicted in FIG. 4, remote control hub is coupled to audio device 164 and media processing device 110 through respective links 168-a and 168-b, which may be wired links.

In one embodiment, the remote control 130 may be used to power on and power off controlled devices including media processing device 110 and audio device 164. The remote control 130 may also be used to perform other operations, such as channel selection, adjusting volume, and selecting options (not shown) that may be presented, for example, on user interface 114 of media processing device 110. In some embodiments, the wireless links 166-a, 166-c used to control audio device 164 and media processing device 110, respectively, may comprise infrared pulses whose pulse sequence is arranged according to the desired operation to be performed in the respective controlled device. The infrared pulses may be received by an infrared detector (not separately shown) located in the respective controlled device, and may be interpreted to perform the specified operation, such as toggling between an "off" and "on" state. In some embodiments, the wireless link 166b between remote control 130 and remote control hub 150 may be an RF link that operates according to any convenient RF wireless protocol. The wireless link 166b may be used to transmit control signals and/or data between remote control 130 and remote control hub 150.

In some embodiments, the remote control hub 150 and remote control 130 may operate in conjunction with one another to control various operations in controlled devices including audio device 164 and media processing device 110. For example, information regarding the device status (device state) of audio device 164 and media processing device 110 may be sent to remote control hub 150 over respective links 168a, 168b. This device state may include, for example, the "on/off" status of each controlled device; the current channel that a device is tuned to receive, such as a television channel or radio channel; and the current audio volume setting for a given controlled device; and other information. Turning again to FIG. 3a and FIG. 3b, information received from audio device 164 and media processing device 110 may be stored in memory 152 of remote control hub 150. In some embodiments, this information may be forwarded over wireless link 166-b to remote control device 130 and stored in memory 138, while in other embodiments, the information may reside only in memory 152 of control hub 150. In various embodiments, this information may be used to tailor the operation of the controlled devices, as described below. In particular embodiments, remote control hub 150 may modify the operation of remote control 130 based upon information received from controlled devices and stored in memory 152. In still other embodiments, status information received from audio device 164 and media processing device 110 may be used to modify operation of remote control 130 without being stored in memory 152 or memory 138.

In various embodiments, one or more operations performed by remote control device 130 may be triggered when the remote control device 130 detects that it is in motion. For example, motion sensor 132 may detect acceleration of remote control device 130, after which the remote control device 130 automatically sends a series of signals using transmitter 136 to control the operation of specified controlled devices. In one example, when a user picks up remote control device 130, the remote control device 130 may be arranged to send a signal to place audio device 164 and media processing device 110 each into an "on" state. In this way, the intelligent remote control system 160 may automate a set of operations that are required for the audio device and media processing device to be placed in a desired state. For example, audio device 164 may be coupled to media processing device 110 to provide high power stereo sound to accompany visual content displayed on media processing device.

In some embodiments, when the motion sensor 132 detects an acceleration of remote control 130, a trigger signal may be sent to remote control hub 150. The remote control hub 150 may then send signals to remote control 130 that direct the series control signals sent to the controlled devices. In this manner, remote control 130 need not store the sequence of control signals to be used to automate the set of operations that place the controlled devices in the desired state. Rather, the remote control 130 may function as a motion detector and a transmitter of control signals based upon the direction of remote control hub 130.

In some embodiments, the remote control 130 may function in either a conventional mode in which the user performs a series of manual operations to place multiple control devices in a desired state, or alternatively, in an automatic mode in which multiple operations are automatically triggered when the user performs minimal operations, such as picking up the remote control device 130.

Turning to FIG. 5, there is shown an exemplary user interface 170 for remote control device 130. The user interface includes a power ("on/off") button 172, and a touch pad portion 174. Under a manual operation (conventional mode), the remote control 130 may function as a universal remote control that can control multiple controlled devices, such as to turn on or off one or more target devices. Thus, referring also to FIG. 4, in manual operation, the power button 172 may be depressed to power on media processing device 110, and may be separately depressed to power on audio device 164. Depending on the exact location and state of audio device 164 and media processing device 110, the user may perform engage power button 172 more than one time to render both devices in an "on" state. The user may further engage touch pad 174 to set other conditions, such as to set a desired channel for viewing on media processing device 110.

In one embodiment of an automatic mode, the remote control 130 may perform all of the aforementioned functions when a user simply picks up the remote control 130. Thus, the act of picking up the remote may power on media processing device 110 and audio device 164 as well as set media processing device 110 to a desired channel.

In various embodiments, the sequence of automatically performed operations to be performed after an initial user act, such as picking up the remote control 130, may be stored by remote control 130 and/or by remote control hub 150. In some embodiments, the sequence may be a fixed algorithm or "macro" that is executed by a processor, such as processor 154 in remote control hub 150 or processor 134 in remote control 130. The macro may be triggered each time the remote control 130 is picked up after a period of quiescence. In one example, after determining that remote control 130 has been "activated" by being picked up, the processor 154 may accordingly direct remote control 130 to transmit a series of wireless control signals, such as infrared pulses to power on media processing device 110 and to select a channel on media processing device. The series of wireless control signals sent from remote control 130 may also direct audio device 164 to power on.

In some embodiments, IRC 160 may provide multiple macros, or programs, from which to choose, so that at any given time one macro is active as the default macro that sets the sequence of operations that remote control 130 performs when it is picked up. Thus, when a first macro is active, the media processing device 110 may automatically power up and tune in to a first TV channel, while when a second macro is active, the media processing device 110 may power up and tune to a second TV channel after remote control 130 is picked up. The ability to select the default macro may be provided using any convenient user interface, such as through any combination of a touch screen, touch pad, and keypad provided on remote control 130 and/or on remote control hub 150. The ability to change the default macro may be welcome when for a period of time the primary user(s) of the media processing device 110 change. Thus, if children are to primarily use the media processing device 110 for a period of a week, it may be appropriate to set a first default macro that automatically selects a TV channel or other source of content appropriate for children. When in a later period, adults are anticipated to be the primary users, a second macro may be appropriate as the default macro that sets the media processing device to provide content appropriate for adults.

Figure 6A:
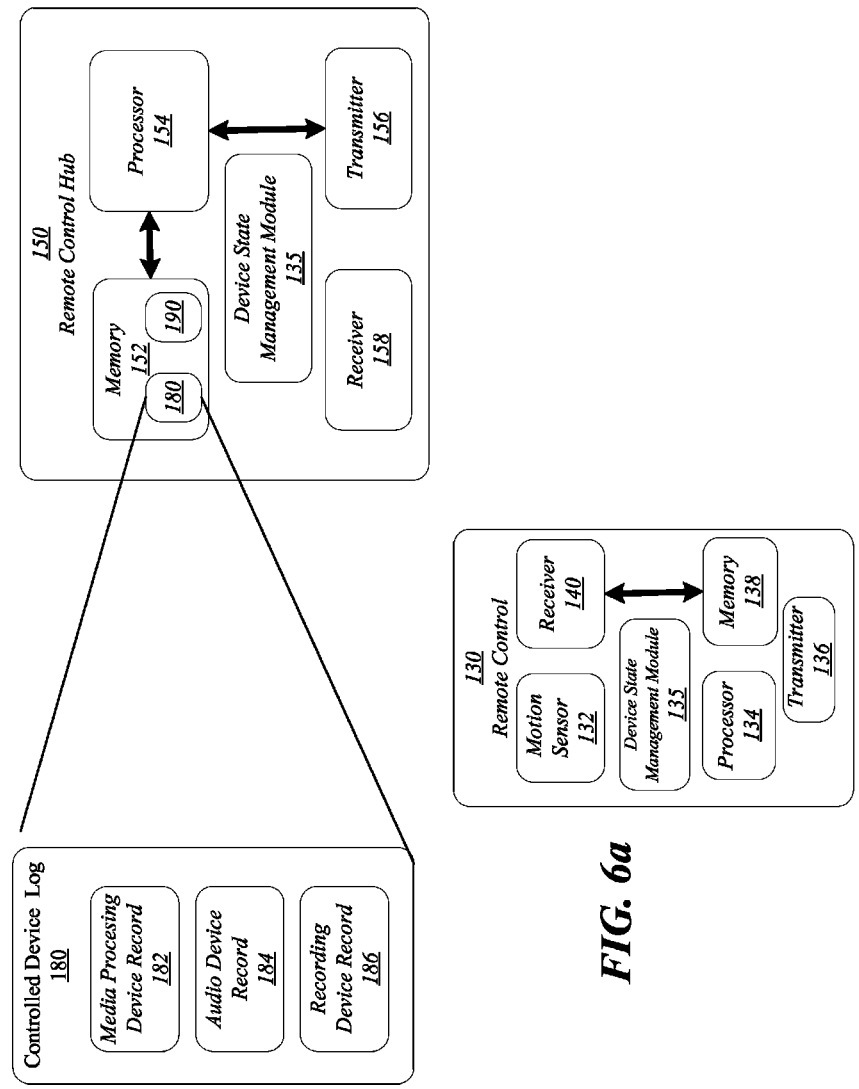
FIG. 6a depicts an embodiment of remote control hub that includes a controlled device log.

In various other embodiments, the sequence of automatic operations that are performed by remote control 130 when picked up (also termed herein "initial default operations") may be determined by the IRC system itself. The remote control 130 or remote control hub 150 may, for example, store various types of information related to operation of one or more controlled devices that are subject to control signals from remote control 130. FIG. 6*a* depicts an embodiment of remote control hub 150 that includes a controlled device log 180. Information stored in controlled device log 180 may include device operation history, that is, a history of operations performed on or by the controlled devices. For example, controlled device log 180 may include media processing device record 182, which provides a record of operations using media processing device 110. The media device processing record 182 may include, for example, when the media processing device was powered on and off over the last month, what TV channels were selected, the duration for which a particular channel was active, and other information. Similarly, audio device record 184 and recording device record 186 may include respective records of operations of audio device 184 and a recording device (not shown). In one embodiment, these records may simply include a record of the current state of each controlled device, that is, a record of the most recent operations performed on the controlled device. For example, media processing device record 182 may simply reflect whether media processing device 110 is presently in an "on" state and what channel was last selected in media processing device 110. In various other embodiments, a more extensive device history that reflects multiple past operations performed on a given controlled device may be stored in controlled device log 180. The information in controlled device log 180 may be obtained through links 168-*a*, 168-*b* as well as links between remote control hub 150 and other controlled devices. This information may be forwarded from a controlled device at various instances, for example, at the time an event involving the controlled device occurs, such as an instance of being powered on or off.

In various embodiments, the information stored in controlled device log 180 may be used in different ways by processor 154 to determine the initial default operations. For example, the media device processing record 182 may indicate the channel surfing history for TV viewing using media processing device, internet surfing history, volume setting, and other factors. The media device processing record 182, as well as other records including audio device record 184 and recording device record 186 may be continually updated so that when the remote control is picked up, the remote control hub 150 and/or remote control device 130 has an up to date record of operation of the controlled devices, such as the controlled devices that may be powered on in the initial default sequence.

In some embodiments, a component within remote control hub 150, such as memory 152, may include program 190. This program may be loaded by processor 154 and used to determine and execute the initial default operations sequence that is to be used by remote control 130. The program 190 may include a set of rules to process the information in controlled device log 180 in order to determine the initial default sequence.

In some embodiments, the remote control 130 may be arranged so that the initial default operations are not initiated when the remote control 130 is simply picked up, or when acceleration of the remote control is otherwise detected. For example, in cases where a set of initial default operations is triggered in remote control 130 when simple motion of the remote control is detected, the initial default operations may be initiated when any movement, intentional or unintentional, of the remote control 130 is detected. Thus, if the remote control 130 is accidentally bumped or dropped with no intention of turning on a set of controlled devices, the devices may nevertheless be turned on by the remote control 130. In various embodiments, remote control 130 may be arranged so that when the remote control is picked up a user is required to also engage a device on the remote control, such as a button, touch pad, or touch screen, in order to initiate the initial default operations.

In various embodiments, the group of initial default operations may be determined in part from environmental factors such as the time of day, the lighting conditions, and the like. For example, a remote control 130 may be operable to initiate a first set of operations that set media processing device 110 to a children's channel if remote control 130 is picked up at 4:00 pm on Wednesday. The remote control 130 may also be operable to set media processing device 110 to a Golf channel if the remote control 130 is picked up at 3:00 pm on Sunday. FIG. 6*b* depicts one embodiment of an intelligent remote control system 160 in which the remote control 130 and/or remote control hub 150 include a calendar clock 144. In various embodiments, the calendar clock may be included within a processor. In some embodiments, the processor 134 may interrogate the calendar clock when the processor is alerted that motion of the remote control 130 has been detected, and thereby make a determination as to what set of initial default operations to initiate.

In further embodiments, the remote control 130 may be operable to automatically adjust display parameters on a controlled device, such as media processing device 110. In one example, the remote control 130 and/or remote control hub 150 may include a light sensor 144 that detects ambient light conditions. In one example, the detected light level may be used by remote control 130 to automatically adjust display brightness and/or contrast on a display of media processing device 110. This automatic adjustment may be performed as a set of initial default operations.

In various other embodiments, the remote control 130 may determine whether to perform the set of initial default operations based upon additional factors. For example, at a first instance, remote control 130 may be picked up after a period of being idle and may initiate a set of initial default operations that power on multiple controlled devices. The remote control 130 may be subsequently placed down and may remain idle for a period of time, for example, 30 minutes. However, upon being picked up after 30 minutes of idleness, the remote control 130 may determine that it has only been idle for a few minutes, and may accordingly assume (correctly) based upon the duration of idleness that no sequence of initial default operations is required, since it is likely that the desired state of the controlled devices has been achieved. Thus, the remote control 130 may be arranged to launch the initial default operations contingent on certain factors, which may include the recency of the last launching of the initial default operations.

In further embodiments, the remote control 130 may be arranged to receive information about the present state of one or more controlled devices, as described in detail below. Equipped with this knowledge, the remote control 130 may avoid executing the initial default operations if the one or more controlled devices are already in the state that is the intended result of the initial default operations. For example, remote control 130 may be set to automatically power on media processing device 110 and audio device 164 when picked up. However, in one scenario, both devices may remain on while the remote control 130 remains idle overnight. The remote control may be apprised of this fact with the result that, when a user picks up the remote control the following day, rather than launching the initial default sequence that attempts to power on media processing device 110 and audio device 164, the remote control refrains from sending any signals to the media processing device 110 or audio device 164. This awareness of the present state of controlled devices therefore allows the remote control 130 to automate desired initial default operations based on a simple trigger, such as being picked up, but also allows the remote control 130 to avoid executing the same initial default operations when to do so may disrupt operation of the controlled devices that are already in the desired operation state.

In various other embodiments, IRC system 160 may include additional components that facilitate this ability of remote control 130 to know the status of various controlled devices and thereby properly manage the controlled devices. The IRC system 160 may further be arranged to alter the operation of remote control 130 based upon the determined status of one or more controlled devices. In some embodiments, the link between a command device in the remote control 130 and the controlled device may be altered by IRC system 160. The command device may be a "power" or "on/off" button or "power" touch screen icon, a "pause/play" button that controls a playing/recording device, a "volume" button, to name a few examples. The link between the command device on the remote control 130 and the controlled device may comprise various different portions in different embodiments. For example, the "power" button may be a device that under some operating conditions causes an electrical signal to be sent in an internal circuit of remote control 130. The internal circuit may be connected to a transmitter, such as a light emitting diode, that transforms the electrical signal into a set of light pulses (which may be in the infrared region) that when received by the controlled device cause the controlled device to alter its present state. In various embodiments, the link between the "power" button and controlled device may be altered under certain circumstances by preventing any electrical signal generated by depressing the power button from triggering a transmitter to transmit a signal designed to change the power state of a controlled device.

For example, referring again to FIG. 4, the "on/off" state of audio device 164 may be known by remote control hub 150 when remote control 130 is picked up and alerts remote control hub 150 that the remote control 130 is "awake." The remote control hub 150 may then "on/off" control signals of remote control 130 to be altered or blocked according to the "on/off" state of audio device 164. For example, the remote control hub 150 may determine based on various criteria, such as the time of day, that the "on" state is the intended state for audio device 164. The remote control hub may therefore determine that any signal received from a "power" button of the remote control 130 is intended to place the audio device 164 in an "on" state. Because the remote control hub 150 is aware that the audio device 164 is already in an "on" state, the remote control hub 150 therefore transmits signals to disable any signal sent from remote control 130 to toggle the "on/off" state of audio device 164. This disabling of signals from the remote control 130 prevents the user from inadvertently turning the audio device off when the user of remote control 130 subsequently presses an "on/off" or "power" button without realizing the audio device 164 is already on.

In some embodiments, the remote control 130 may be arranged to indirectly control a controlled device, such as audio device 164. For example, remote control 130 may transmit control signals via remote control hub 150, which receives wireless signals from remote control 130 and forwards the appropriate signals to the respective controlled devices based upon the received wireless signals. Accordingly, in some embodiments, based upon the determined "on/off" state of a controlled device, the remote control hub 150 may transmit control signals as-intended, modify, or block the control signals received from remote control 130 that are intended for controlled devices.

Figure 7:
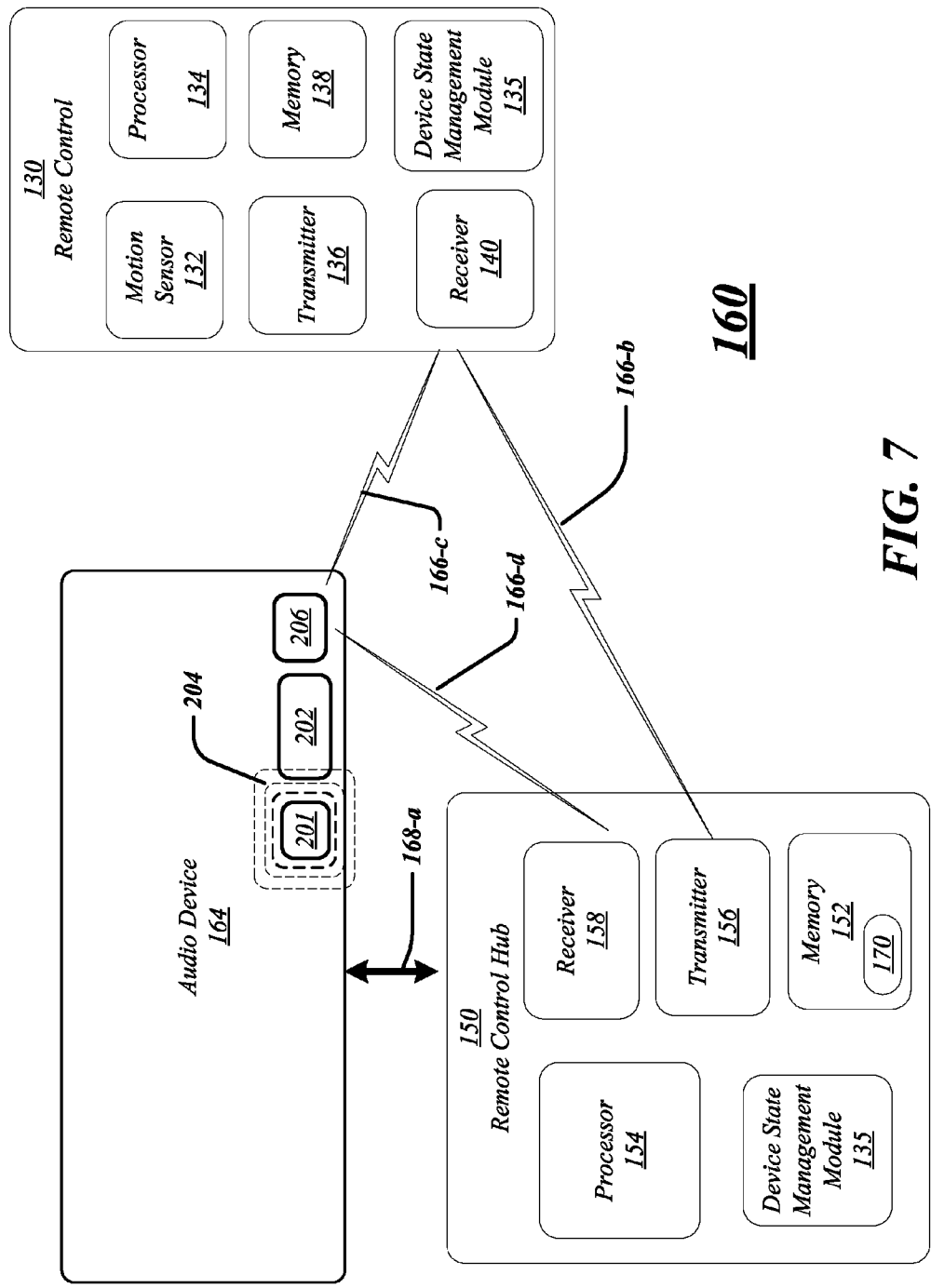
FIG. 7 depicts an embodiment in which remote control hub and/or remote control are arranged to receive a signal from a device that indicates whether the device is powered on or not.

FIG. 7 depicts an embodiment in which remote control hub 150 and/or remote control 130 are arranged to receive a signal from audio device 164 that indicates whether audio device 164 is powered on or not. As illustrated, audio device 164 includes a sensor 202, which may be arranged to detect light emitted from a pilot light 201 that may be provided on audio device 164. When audio device 164 is powered on, pilot light 201 emits electromagnetic radiation, which is detected by sensor 202. Sensor 202 may be coupled to link 168-*a* so that if radiation from pilot light 201 is detected, sensor 202 may send a signal to remote control hub 150 indicating that audio device 150 is powered on. Alternatively, sensor 202 may be coupled to a wireless transmitter 206 that is operable to send signals over wireless link 166*d* to receiver 158 of remote control hub 150. The wireless link may be an infrared or radio frequency link in some embodiments. In some embodiments, sensor 202 and wireless transmitter 206 may be add-on components that are designed to operate with remote control hub 150. Thus, sensor 202 and transmitter 206 may be added to any controlled device having a pilot light in order to provide a wireless signal to remote control hub 150 as to the power status of a controlled device. For example, if the remote control hub 150 does not receive a signal from wireless transmitter 206 indicating that sensor 202 has detected radiation, the remote control hub may determine that audio device 150 is in an "off" state.

Once remote control hub 150 is aware of the "on/off" status of audio device 164, this information may be transmitted to the remote control 130 at the appropriate time. For example, in some embodiments, the IRC system 160 may be arranged such that the remote control hub 150 may transmit the "on/off" status of audio device 164 when remote control 130 is picked up. In one embodiment, when remote control 130 is picked up motion sensor 132 detects an acceleration and provides a signal for transmitter 136 to send to remote control hub 150 alerting the remote control hub that remote control device is "active" and ready to be used. In turn, remote control hub 150 returns a wireless signal to receiver 140 that provides the "on/off" status of audio device 164.

Alternatively, or in addition, transmitter 206 of audio device 164 may directly send a wireless signal over wireless link 166-*c* alerting remote control device 130 of the "on/off" status of audio device 164. Similar light sensors and transmitters may be provided in other controlled devices, such as media processing device 110, recording devices, lighting devices, and any other devices that may be susceptible to control by remote control 130.

In other embodiments, based on knowledge of the "on/off" status of controlled device(s), such as audio device 164, the remote control hub 150 may simply take actions to modify control signals from remote control 130 meant for the controlled device in question without having to alert the remote control 130 as to the "on/off" status of the controlled device.

Once the remote control 130 is aware of the state of the controlled device(s), it then becomes meaningful for the remote to allow a user to command explicit "power-on" and "power-off" commands using, for example, power button 172. Depending on whether the current state of the controlled device matches the commanded state, a processor in system 160, such as processor 134 located in remote control 130, or processor 154 in remote control hub 150, may direct an infrared pulse sequence to be transmitted or not transmitted when a user presses power button 172.

Additionally, by providing awareness of the "on/off" status of controlled devices, IRC system 160 allows a remote control 130 to verify that a command was successfully received. For example, remote control 130 may be provided with a signal indicating that audio device 164 is powered on. A user who wishes to turn audio device 164 off may subsequently engage power button 172 to turn off audio device 164 remotely, which is anticipated to transmit a signal to power off audio device 164. If audio device 164 does not properly receive or process the signal from remote control 130, sensor 202 may detect radiation 204, causing a subsequent signal to be transmitted to remote control 130 indicating that audio device 164 remains powered on. Remote control 130 can then retransmit a signal to turn audio device 164 off as desired.

FIG. 8*a* illustrates one embodiment of an intelligent remote control system 250, which includes an intelligent plug box 252 and intelligent power strip 270. The intelligent power strip 270 includes power receptacles 272-*a* to 272-*d*, which may supply power to controlled devices when the controlled devices are plugged into the intelligent power strip 270. For example, audio device 164, media processing device 110, and lighting device 210 may be plugged into respective power receptacles 272-*b*, 272-*c* and 272-*d*. Each power receptacle may be coupled to an internal relay in the intelligent power strip 270 or to an external relay (not shown) in the intelligent plug box 252, which may be toggled between positions that either couple or decouple the given receptacle from a source of power. In one embodiment, the "on/off" state may be set by relays within each individual receptacle 272-*a* to 272-*d*. The "on/off" states may be transmitted to intelligent plug box 252, for example, via a link 264. Intelligent plug box 252 may then transmit this information to remote control 130, for example, using infrared pulses, which, when received, alert the remote control as to the state of each individual receptacle 272*a* to 272*b*. The remote control 130 may thereby be apprised of the "on/off" state of controlled devices plugged into intelligent power strip 270. For example, each controlled device plugged into a given receptacle of intelligent power strip 270 may be set to be "on" when power is supplied to the given receptacle. Thus, if intelligent plug box 252 detects that an individual power receptacle is in an "on" state, remote control 130 may then be assured that the controlled device coupled to that power receptacle is "on."

A current sensor may also be provided either in intelligent plug box 252 or intelligent power strip 270 to monitor current drawn by each controlled device plugged into intelligent power strip 270 to verity the "on/off" state of each controlled device. In some embodiments, the intelligent plug box 152 may also report the value of current being drawn by a controlled device. The amount of current being drawn may indicate to the remote control 130, for example, the state of a controlled device where the device is operable in multiple states corresponding to multiple power levels.

Figure 8B:
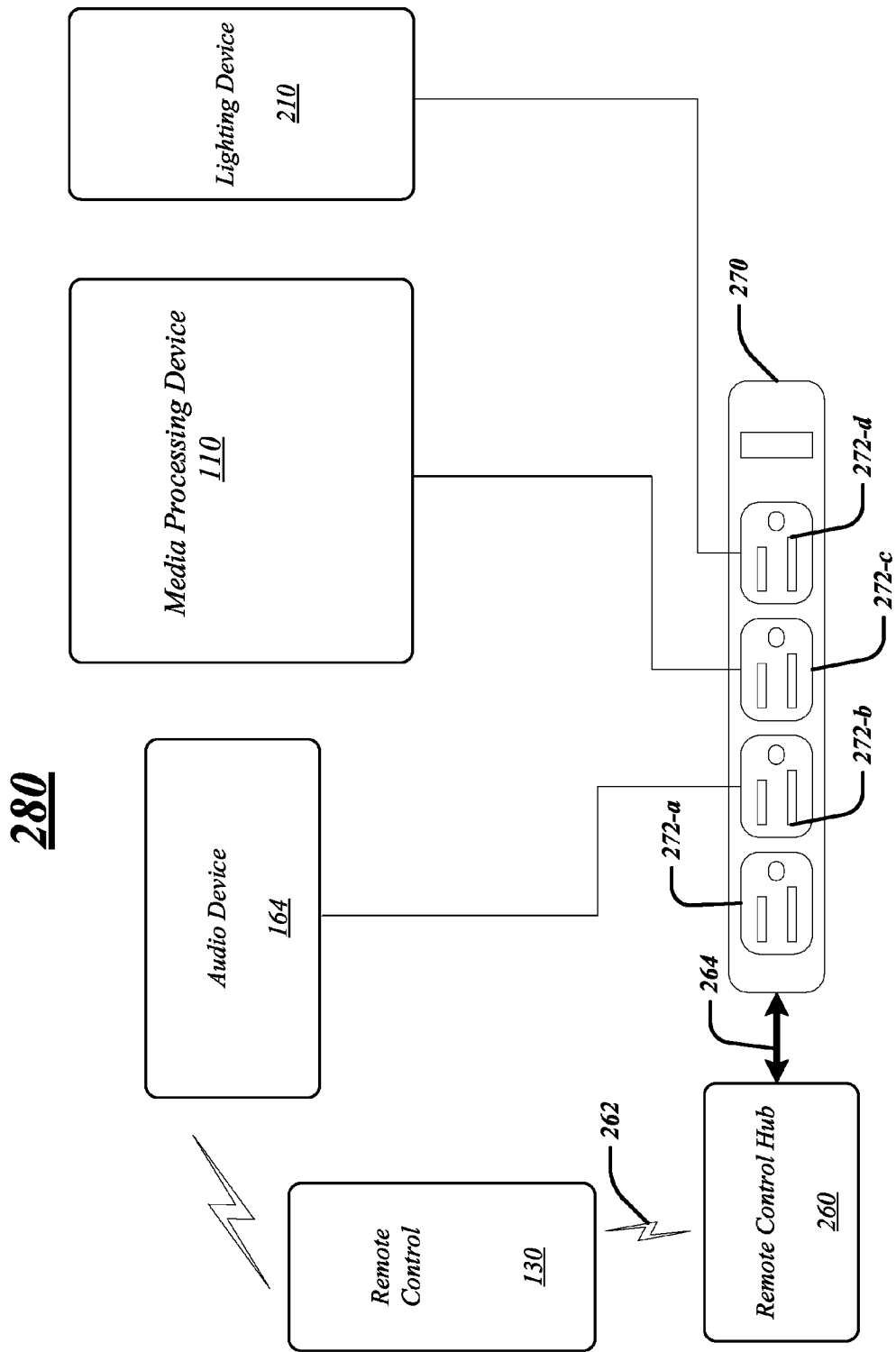
FIG. 8b illustrates another embodiment of an intelligent remote control system.

In other embodiments, as depicted in IRC system 280 of FIG. 8*b*, a remote control hub 260 may be used to provide the aforementioned functionality of intelligent plug box 252. In some embodiments, the remote control hub 260 may additionally include components and functionality similar to that described above with respect to remote control 150.

In some embodiments, a remote control hub, such as remote control hub 150 or remote control hub 260, may proceed in various ways based upon determination of the state of one or more controlled devices. When the remote control 130 is being operated routinely, that is, when a user is manually pressing one or more command devices on the remote control, the remote control hub may send control signals to modify the operation of remote control 130 or may treat control signals received from the remote control 130 based upon a determination of the state of one or more controlled devices. In one example, remote control 130 may be arranged to produce a specific control signal to toggle the power state of audio device 164. The term "power state" refers to a different states of a device associated generally with the different amount of power being drawn by a controlled device. For example, an "on" state corresponds to one power state, and an "off" state where little or no power is being drawn corresponds to another power state. When a controlled device is "on" the controlled device may also be operable in multiple different power states, such as an "idle" power state where less power is drawn as compared to an "active" power state. The remote control hub 150 may determine that audio device 164 is currently in an "on" state. Subsequently, the remote control 130 may be picked up by a user and signals may be transmitted to remote control hub 150 indicating that the remote control 130 has been picked up. Remote control hub 150 may therefore ascertain that a control signal initiated by a "power" button remote control 130 to audio device 164 is meant to power on the audio device. Accordingly, the remote control hub 150 may send a signal to remote control 130 so that when the user presses a "power" button, the control signal to be generated by remote control 130 and meant for audio device 164 is disrupted or altered in a manner that prevents audio device 164 from receiving a signal to toggle its power state from its present power state. In other words, if the present power state that has already been determined by remote control hub 150 (that is, the "on" state) is the intended power state for audio device 164, a control signal to toggle the "on/off" state is not transmitted from remote control 130 to audio device 164. Accordingly, the audio device 164 remains in an "on" state even after a user depresses a "power" button of remote control 130. In various embodiments, each "power on" control signal employed by remote control 130 may be specific to a controlled device, so that "power on" control signals may be disrupted only for those devices where it is determined that the power state is not to be changed. Thus, when a user picks up a remote control 130 and attempts to power on multiple controlled devices using a "power" button, only those devices that are in an "off" state receive signals to switch their power state.

In further embodiments, the knowledge of the power status of controlled devices may be used to tailor the initial default operations of a remote control 130 discussed above. Thus, if remote control hub 150 verifies that media processing device 110 is in an "off" state, and the audio device 164 is in an "off" state, the initial default operations that are set for remote control 130 may include sending multiple control signals to adjust the state of media processing device 110 and audio device 164. A first control signal may be sent to toggle the power state of media processing device 110, thereby turning the media processing device 110 on. A second control signal may be sent to toggle the power state of audio device 164, with the result that audio device 164 switches to an "on" state. A further control signal may be sent to set a predetermined channel on media processing device 110.

On the other hand, in a scenario in which the remote control hub 150 determines that media processing device 110 and audio device 164 are both in an "off" state, the initial default operations that are set to take place when a user picks up remote control 130 may simply involve setting a predetermined channel on media processing device 110. This is because remote control hub 150 has determined that both audio device 164 and media processing device 110, which are both to be powered on at the conclusion of the initial default operations, are already in an "on" state.

Figure 9:
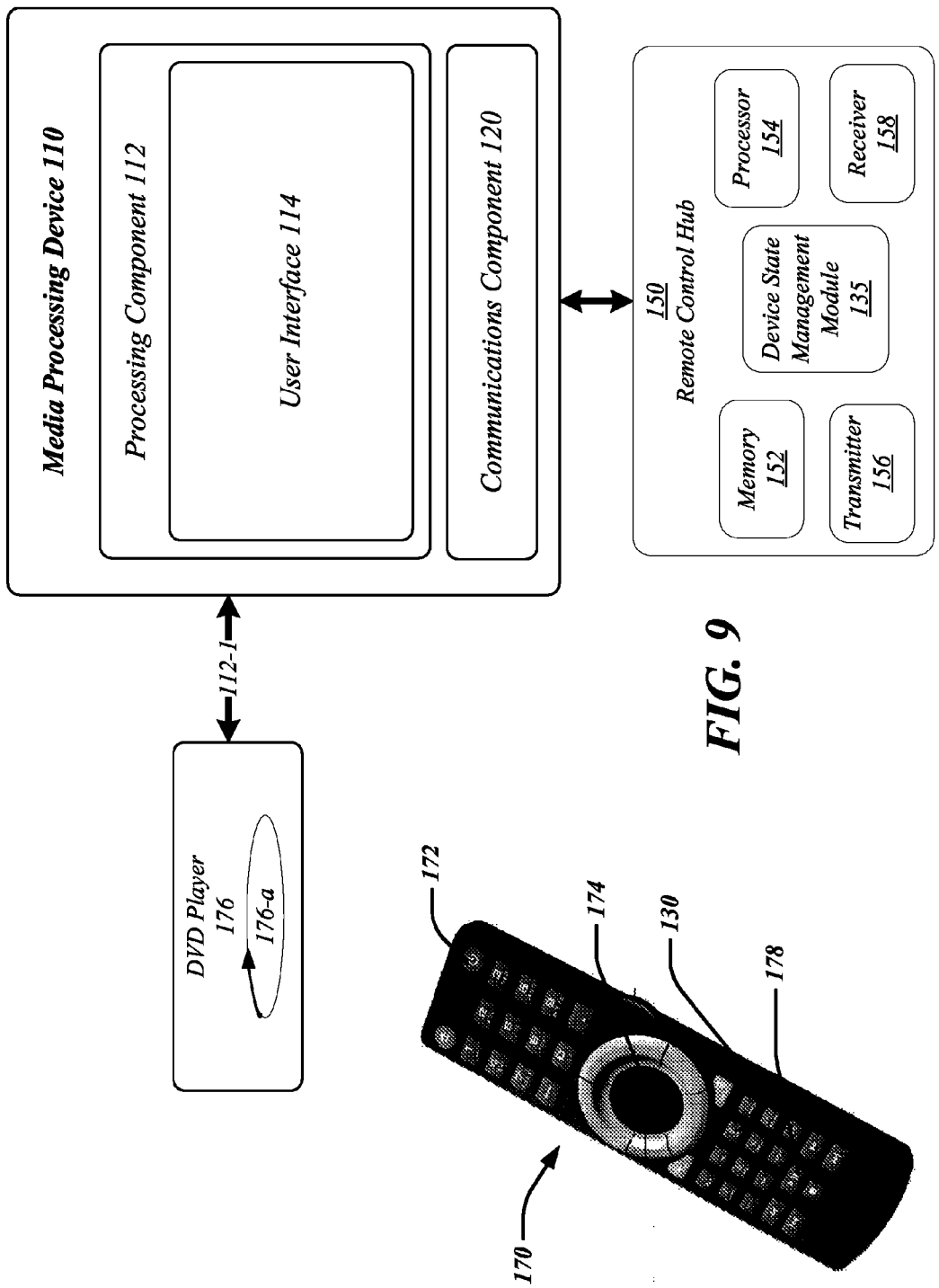
FIG. 9 depicts an embodiment of a media processing system in which media processing device is coupled to a DVD player.

In further embodiments, the IRC system 160 may be arranged to modify additional operations of remote control 130 according to a detected state in a controlled device. FIG. 9 depicts an embodiment of a media processing system in which media processing device 110 is coupled to a DVD player 176. In one embodiment, the functionality of a "pause/play" button 178 on remote control 130 may be tailored to the current state of the DVD player 176. In the scenario shown, DVD player 176 may be in a "play" mode in which a DVD 176-a is being played. Thus, if remote control hub 150 determines that the intended mode of the DVD player 176 is a "play" mode, the remote control hub 150 may direct signals so that any toggle command initiated by the "pause/play" button 178 is not received at the DVD player 176. In this manner, rather than inadvertently stopping the DVD 176-a, the user command, which the user believes will toggle from a "paused" state to a "play" state, is overridden, allowing the DVD 176-a to continue playing.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
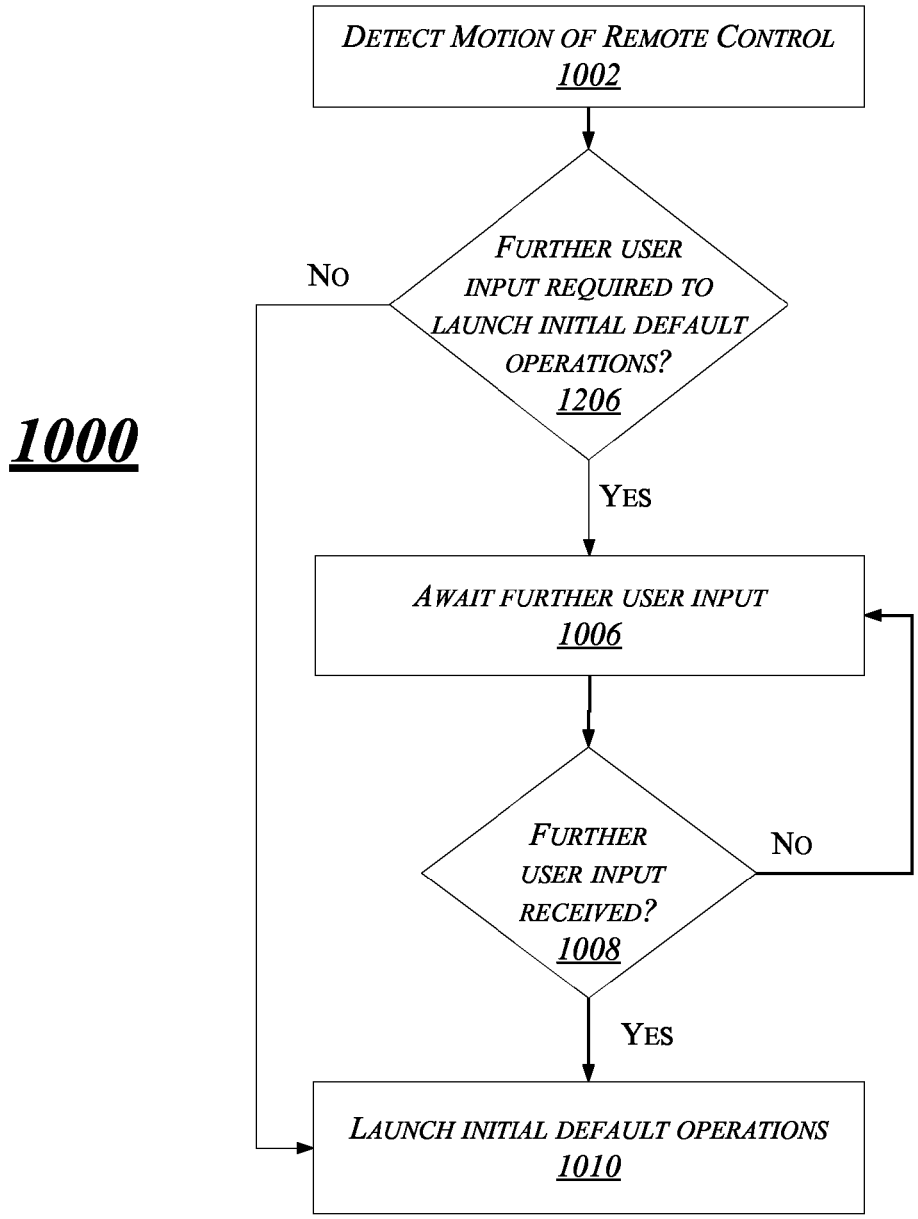
FIG. 10 depicts one exemplary logic flow.

FIG. 10 depicts one exemplary logic flow 1000. At block 1002, motion of the remote control is detected. In some embodiments, the motion may be detected using internal accelerometers within the remote control. At block 1004 it is determined whether further user input is needed. The further user input may be, for example, engaging a button or touch screen of the remote control. If further user input is needed, the flow moves to block 1006 where the remote control awaits further user input. If not, the flow moves to block 1010 where an initial set of default operations is launched. These operations may include powering on a set of controlled devices and adjusting functions in the controlled devices, such as TV channels, audio volume, display brightness, and other functions. At block 1008 if further user input is not received, the flow returns to block 1006. If further user input is received, the flow moves to block 1010.

Figure 11:
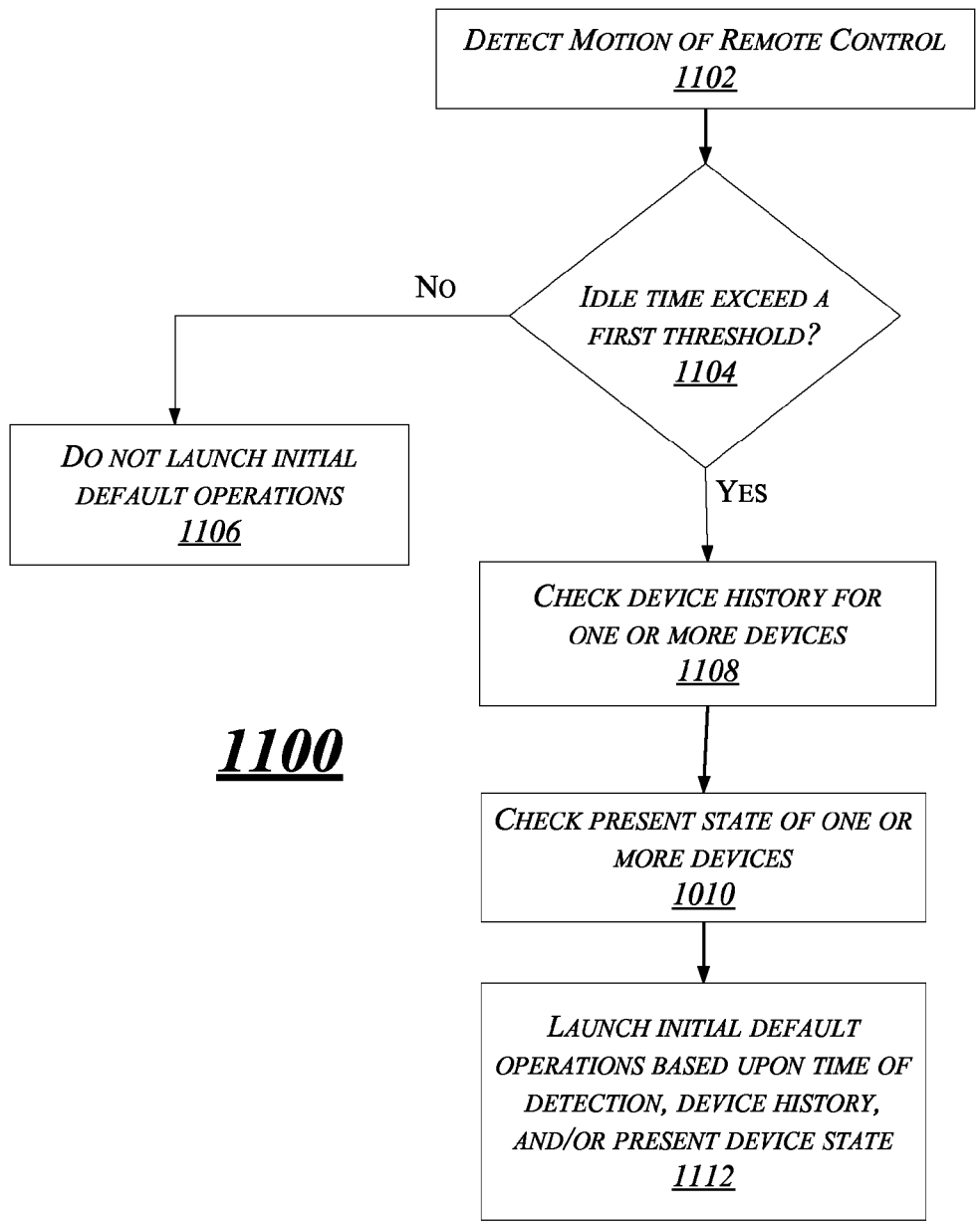
FIG. 11 depicts another exemplary logic flow.

FIG. 11 depicts another exemplary logic flow 1100. At block 1102, motion is detected in the remote control. At block 1104, the time at which motion is detected may be used to determine how long the remote control has been idle (idle time). At block 1104, if the idle time has not exceeded a first threshold, the logic proceeds to block 1106, where no default operations are launched. If the idle time exceeds a first threshold, the flow proceeds to block 1108. At block 1108, the device history is checked for one or more controlled devices. At block 1110, the current state of one or more devices is checked, including information such as whether the devices are powered on or off. At block 1112, a set of default operations are initiated by the remote control. The set of default operations may be based upon one or more of the time, device history, and current state of the controlled device(s).

Figure 12A:
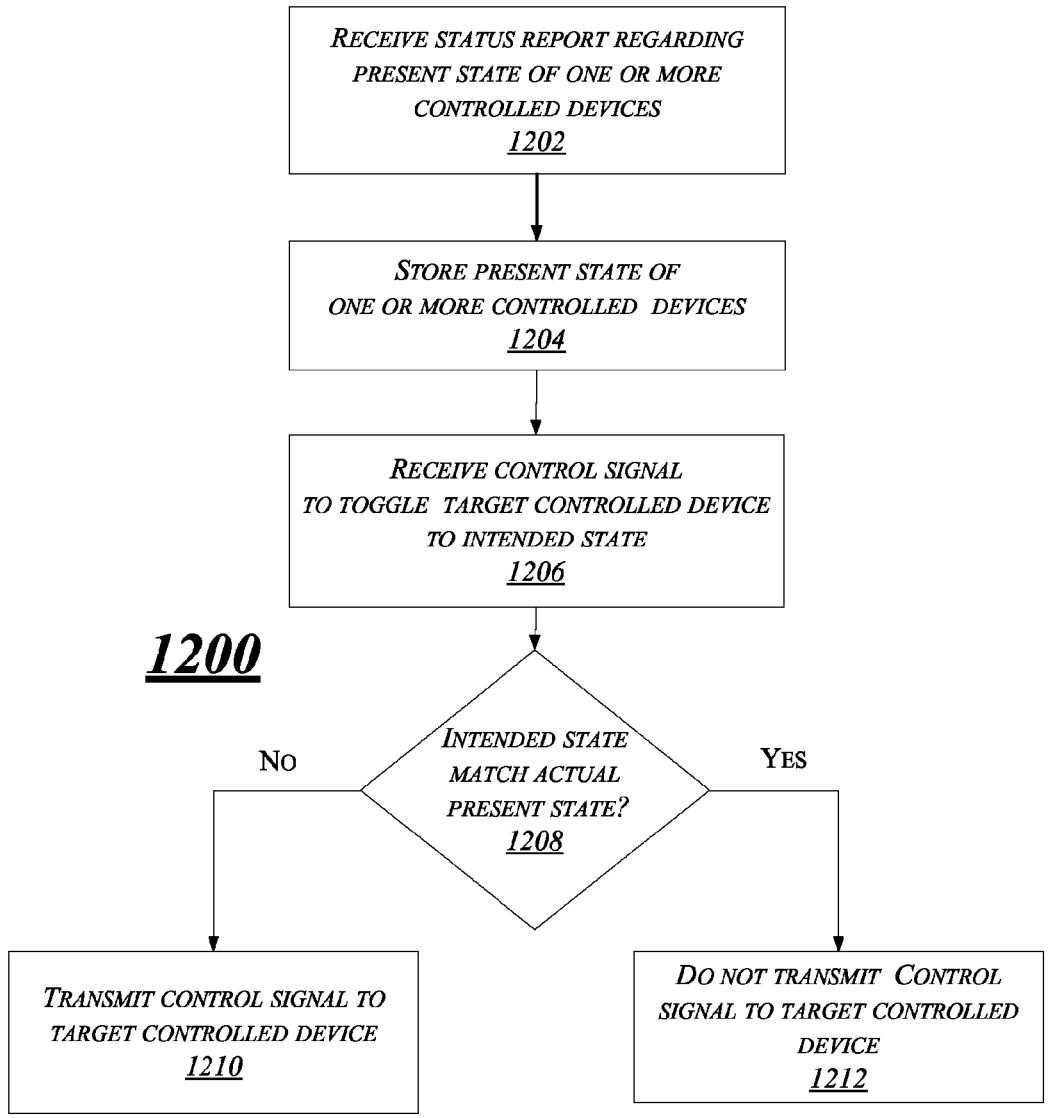
FIG. 12a depicts a further exemplary logic flow.

FIG. 12a depicts another exemplary logic flow 1200. At block 1202 a remote control receives status reports corresponding to the state of one or more controlled devices. In some embodiments, the status report for each controlled device may be signals received from a monitoring device that monitors an/on off state in each controlled device. At block 1204 the remote control stores the actual present state of the one or more controlled devices based on the received signals. At block 1206, the remote control receives a signal from a user interface in the remote control to toggle a target controlled device to an intended state. At block 1208, the remote control determines whether the actual state of the target controlled device matches intended state. If not, the flow moves to block 1210, where the signal is transmitted. If so, the flow moves to block 1212, where no signal is transmitted to the target controlled device.

Figure 12B:
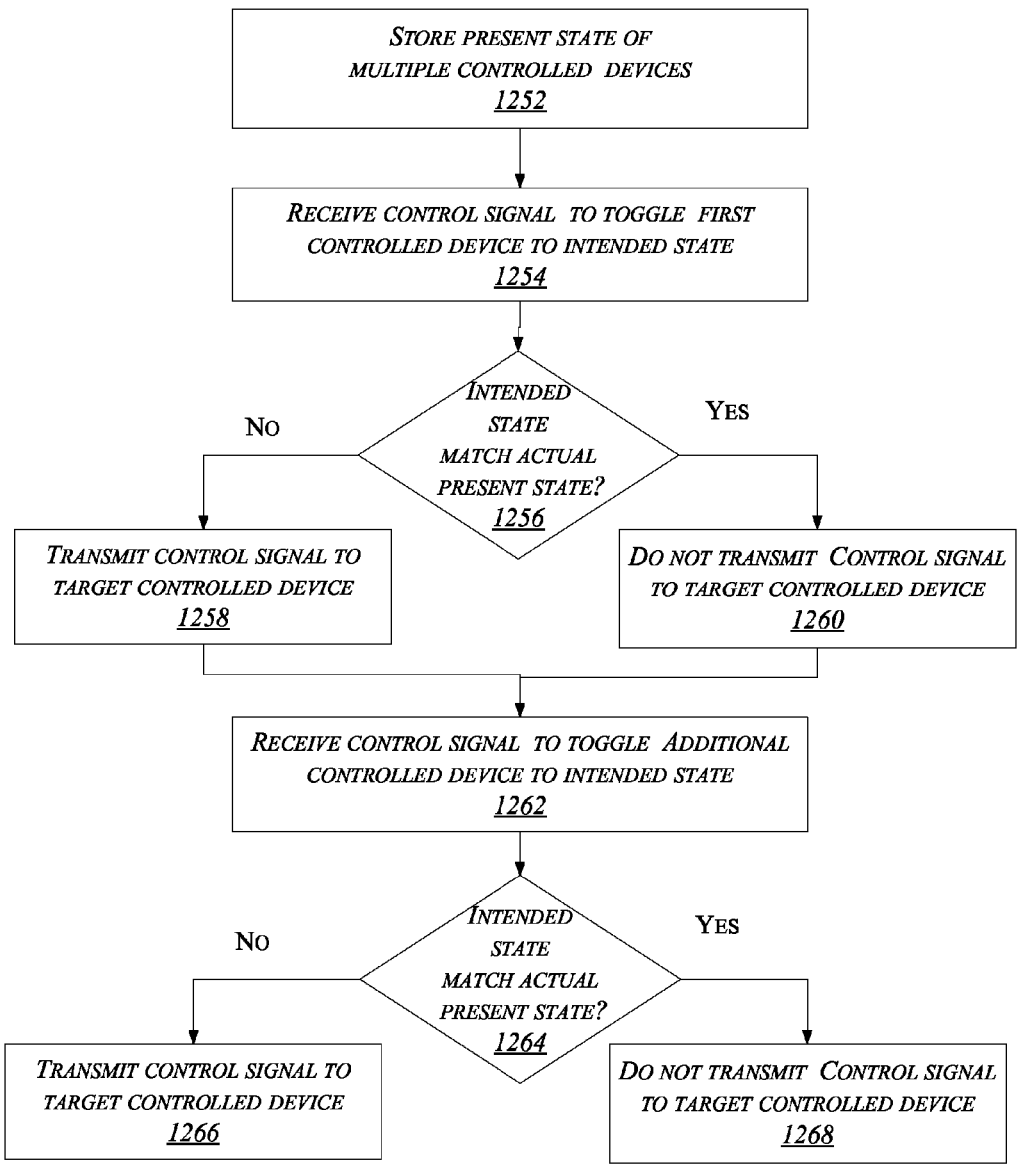
FIG. 12b depicts still another exemplary logic flow.

FIG. 12b depicts another exemplary logic flow 1250. At block 1252 the remote control hub stores the present state of the multiple controlled devices. At block 1254, the remote control hub receives a signal from remote control 130 to toggle a state in a first controlled device. At block 1256, the remote control hub determines whether the actual state of the target controlled device matches intended state. If not, the flow moves to block 1258, where the signal is transmitted. If so, the flow moves to block 1260, where no signal is transmitted to the target controlled device. At block 12624, the remote control hub receives a signal from remote control 130 to toggle a state in an additional controlled device. At block 1264, the remote control hub determines whether the actual state of the additional controlled device matches intended state. If not, the flow moves to block 1266, where the signal is transmitted. If so, the flow moves to block 1268, where no signal is transmitted to the target controlled device. In further embodiments of a logic flow, the sequence of blocks 1262-1268 may be repeated for multiple additional controlled devices.

Figure 13:
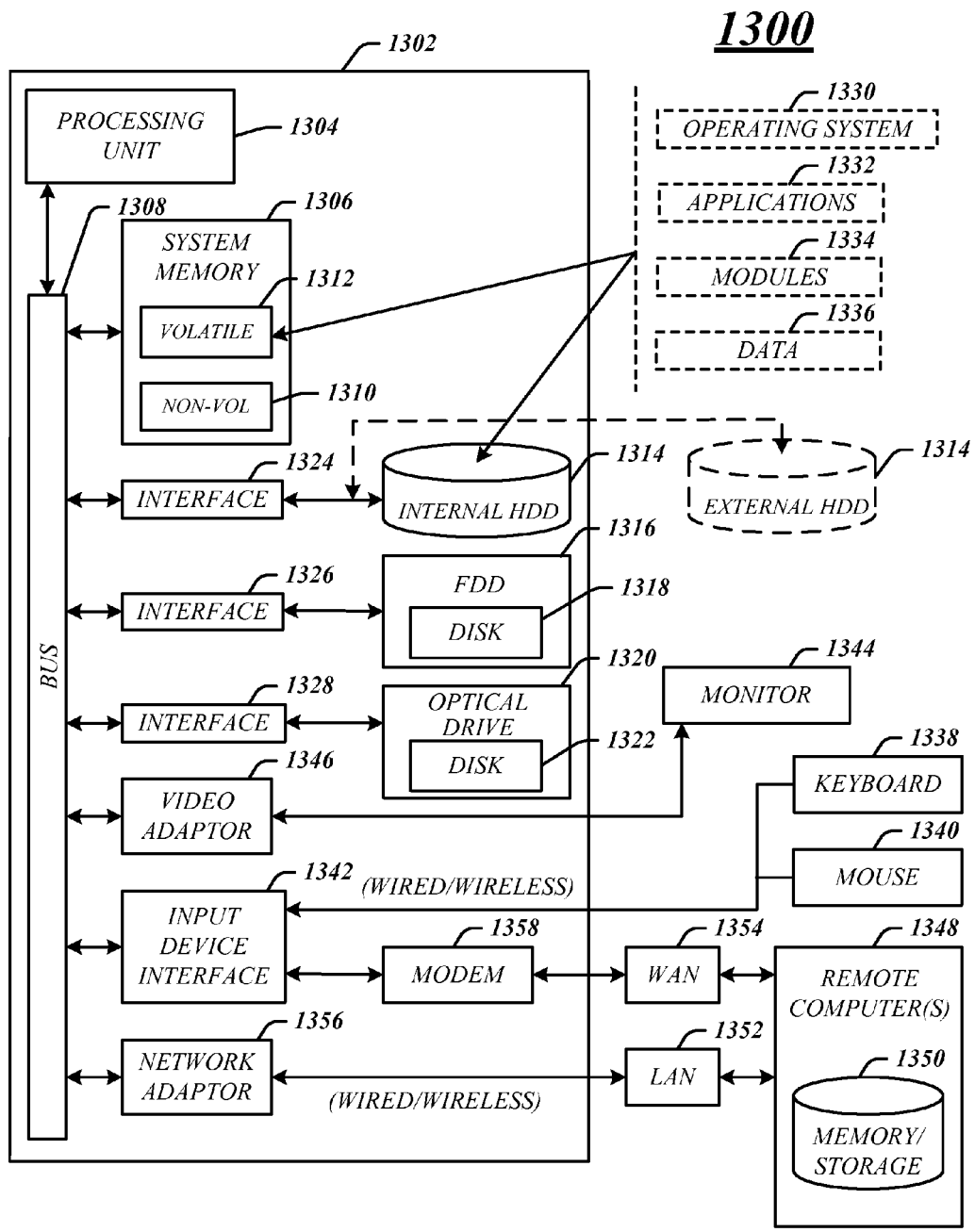
FIG. 13 illustrates one embodiment of a computing architecture.

FIG. 13 illustrates an embodiment of an exemplary computing architecture 1300 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1300 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1300 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1300.

As shown in FIG. 13, the computing architecture 1300 comprises a processing unit 1304, a system memory 1306 and a system bus 1308. The processing unit 1304 can be any of various commercially available processors. Dual microprocessors and other multi processor architectures may also be employed as the processing unit 1304. The system bus 1308 provides an interface for system components including, but not limited to, the system memory 1306 to the processing unit 1304. The system bus 1308 can be any of several types of bus structure that may further interconnect to a memory bus (with or without a memory controller), a peripheral bus, and a local bus using any of a variety of commercially available bus architectures.

The computing architecture 1300 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 1306 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 13, the system memory 1306 can include non-volatile memory 1310 and/or volatile memory 1312. A basic input/output system (BIOS) can be stored in the non-volatile memory 1310.

The computer 1302 may include various types of computer-readable storage media in the form of one or more lower speed memory units, including an internal hard disk drive (HDD) 1314, a magnetic floppy disk drive (FDD) 1316 to read from or write to a removable magnetic disk 1318, and an optical disk drive 1320 to read from or write to a removable optical disk 1322 (e.g., a CD-ROM or DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1310, 1312, including an operating system 1330, one or more application programs 1332, other program modules 1334, and program data 1336.

A user can enter commands and information into the computer 1302 through one or more wire/wireless input devices, for example, a keyboard 1338 and a pointing device, such as a mouse 1340. Other input devices may include a microphone, an infra-red (IR) remote control, a joystick, a game pad, a stylus pen, touch screen, or the like. These and other input devices are often connected to the processing unit 1304 through an input device interface 1342 that is coupled to the system bus 1308, but can be connected by other interfaces such as a parallel port, IEEE 1394 serial port, a game port, a USB port, an IR interface, and so forth.

A monitor 1344 or other type of display device is also connected to the system bus 1308 via an interface, such as a video adaptor 1346. In addition to the monitor 1344, a computer typically includes other peripheral output devices, such as speakers, printers, and so forth.

The computer 1302 may operate in a networked environment using logical connections via wire and/or wireless communications to one or more remote computers, such as a remote computer 1348. The remote computer 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, connects to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 14:
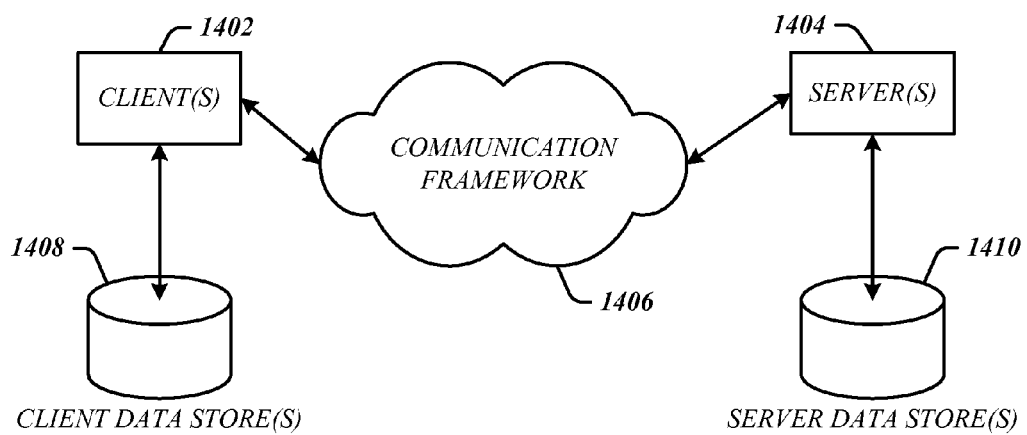
FIG. 14 illustrates one embodiment of a communications architecture.

FIG. 14 illustrates a block diagram of an exemplary communications architecture 1400 suitable for implementing various embodiments as previously described. The communications architecture 1400 includes various common communications elements, such as a transmitter, receiver, transceiver, radio, network interface, baseband processor, antenna, amplifiers, filters, and so forth. The embodiments, however, are not limited to implementation by the communications architecture 1400.

As shown in FIG. 14, the communications architecture 1400 comprises includes one or more clients 1402 and servers 1404. The clients 1402 may implement the client systems 310, 400. The servers 1404 may implement the server system 330. The clients 1402 and the servers 1404 are operatively connected to one or more respective client data stores 1408 and server data stores 1410 that can be employed to store information local to the respective clients 1402 and servers 1404, such as cookies and/or associated contextual information.

The clients 1402 and the servers 1404 may communicate information between each other using a communication framework 1406. The communications framework 1406 may implement any well-known communications techniques and protocols, such as those described with reference to system 1300. The communications framework 1406 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a processor;
   a device state management module operative on the processor to:
   receive a trigger signal indicating motion of a remote control;
   determine a device state of one or more controlled devices;
   determine an intended state of the one or more controlled devices;
   send state management instructions to be transmitted to the one or more controlled devices, the state management instructions directing a set of initial default operations that comprise altering one or more of the device states in the one or more controlled devices;
   determine whether the device state matches the intended state; and
   direct a signal based on a determination that the device state matches the intended state, the signal to prevent transmission of a control signal from the remote control to the one or more controlled devices, the control signal to toggle the device state; and
   a memory communicatively coupled to the processor, the memory to store the determined device state of the one or more controlled devices.

2. The apparatus of claim 1, the device state management module to select the set of initial default operations based at least in part on the determined device state of the one or more controlled devices.

3. The apparatus of claim 1, comprising a receiver communicatively coupled to the processor, the receiver to receive signals indicating a device state of the one or more controlled devices.

4. The apparatus of claim 3, the receiver to receive wireless signals transmitted from one or more sensors, the one or more sensors to detect a light signal emitted from the respective one or more controlled devices.

5. The apparatus of claim 3, the device state management module to determine the device state based upon received signals indicating a power state in one or more power receptacles of a power strip connected to the one or more controlled devices.

6. The apparatus of claim 1, the device state management module to determine the set of initial default operations based at least in part upon determination of one or more of:
a time of day when the trigger signal is received, a duration of idleness of the remote control before the trigger signal is received, or a lighting condition proximate the one or more controlled devices.

7. The apparatus of claim 1, the device state management module to determine the set of initial default operations at based at least in part on information stored in a controlled device log in the memory, the information to include an operation history of the one or more controlled devices.

8. The apparatus of claim 1, comprising a transmitter communicatively coupled to the processor, the transmitter to transmit a wireless signal to prevent the transmission of the control signal for toggling device state.

9. The apparatus of claim 1, the determined device state and intended state each comprising a powered state of a controlled device.

10. The apparatus of claim 1, the determined device state and intended state each comprising a play mode of a controlled device.

11. The apparatus of claim 1, comprising a light sensor communicatively coupled to the processor, the light sensor to detect light intensity proximate the one or more controlled devices.

12. The apparatus of claim 1, comprising a digital display communicatively coupled to the processor.

13. The apparatus of claim 1, the memory to store a multiplicity of user-selectable programs, each user-selectable program defining a respective set of initial default operations.

14. An article comprising a non-transitory computer-readable storage medium storing instructions that, when executed by a processor, enable a system to:
   receive a trigger signal from a motion sensor in a remote control;
   determine a device state of one or more controlled devices;
   determine an intended state of the one or more controlled devices;
   launch a set of initial default operations that comprise altering one or more of the device states in the one or more controlled devices;
   determine whether the device state matches the intended state; and
   direct a signal based on a determination that the device state matches the intended state, the signal to prevent transmission of a control signal from the remote control to the one or more controlled devices, the control signal to toggle the device state.

15. The article of claim 14, storing instructions that, when executed by the processor, enable the system to send instructions to transmit one or more control signals to change a device state in at least one controlled device of the one or more controlled devices.

16. The article of claim 14, storing instructions that, when executed by the processor, enable the system to send instructions to transmit control signals that are arranged to place a multiplicity of controlled devices in a powered state.

17. The article of claim 14, storing instructions that, when executed by the processor, enable the system to:
   receive a wireless signal from at least one sensor coupled to a respective controlled device of the one or more controlled devices, the wireless signal indicating detection of light emitted from the respective controlled device; and
   determine that the respective controlled device is in an powered state.

18. The article of claim 14, storing instructions that, when executed by the processor, enable the system to determine the device state based upon a power state of one or more power receptacles of a power strip, each power receptacle being connected to a respective controlled device of the one or more controlled device.

19. The article of claim 14, storing instructions that, when executed by the processor, enable the system to:
   determine, based at least in part upon receiving the trigger signal, one or more factors, the one or more factors selected from the group consisting of a time of day, a duration of idleness of the remote control in an immediately preceding period, or a lighting condition proximate the one or more controlled devices; and
   adjust the set of initial default operations based upon the determining the factors.

20. The article of claim 14, storing instructions that, when executed by the processor, enable the system to determine the set of initial default operations based upon an operation history of the one or more controlled devices.

21. A method, comprising:
   receiving a trigger signal from a motion sensor in a remote control;
   determining a device state of one or more controlled devices;
   determining an intended state of the one or more controlled devices;
   determining whether the device state matches the intended state;
   directing a signal based on a determination that the device state matches the intended state, the signal to prevent transmission of a control signal from the remote control to the one or more controlled devices, the control signal to toggle the device state;
   storing the device state of the one or more controlled devices; and
   launching a set of initial default operations that comprise altering one or more of the device states in the one or more controlled devices.

22. The method of claim 21, comprising sending instructions to transmit one or more control signals to change a device state in at least one controlled device of the one or more controlled devices.

23. The method of claim 22, the control signals to power on a multiplicity of controlled devices.

24. The method of claim 21, comprising:
   receiving a wireless signal from at least one sensor coupled to a respective controlled device of the one or more controlled devices, the wireless signal to indicate detection of light emitted from the respective controlled device; and
   determining that the respective controlled device is in a powered state.

25. The method of claim 21, comprising determining the device state based upon a power state of one or more power receptacles of a power strip, each power receptacle being connected to a respective controlled device of the one or more controlled device.

26. The method of claim 21, comprising:
   determining, based at least in part upon receiving the trigger signal, one or more factors, the one or more factors selected from the group consisting of a time of day, a duration of idleness of the remote control in an immediately preceding period, or a lighting condition proximate the one or more controlled devices; and
   adjusting the set of initial default operations based upon the determining the factors.

27. The method of claim 21, comprising determining the set of initial default operations based upon an operation history of the one or more controlled devices.

* * * * *